United States Patent
Mirsu et al.

(10) Patent No.: US 12,547,478 B1
(45) Date of Patent: Feb. 10, 2026

(54) RULE PROCESSING FOR CROSS-ACCOUNT EVENT ASSOCIATION

(71) Applicant: Amazon Technologies, Inc., Seattle, WA (US)

(72) Inventors: Radu Florin Mirsu, Vancouver (CA); Rishi Baldawa, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 532 days.

(21) Appl. No.: 17/119,801

(22) Filed: Dec. 11, 2020

(51) Int. Cl.
- *G06F 9/54* (2006.01)
- *G06F 9/455* (2018.01)
- *G06N 5/025* (2023.01)

(52) U.S. Cl.
CPC .......... *G06F 9/542* (2013.01); *G06F 9/45558* (2013.01); *G06N 5/025* (2013.01); *G06F 2009/45591* (2013.01)

(58) Field of Classification Search
CPC . G06F 9/54; G06F 9/455; G06F 9/542; G06F 9/45558; G06F 2009/45591; G06N 5/02; G06N 5/025; H04L 51/14; H04L 51/22; H04L 41/22; H04L 41/0686
USPC .......................................................... 709/224
See application file for complete search history.

(56) References Cited

U.S. PATENT DOCUMENTS

| | | | | |
|---|---|---|---|---|
| 8,239,880 | B1 * | 8/2012 | Caccavale | G06F 9/542 719/318 |
| 8,763,015 | B1 * | 6/2014 | Caccavale | G06F 9/542 714/1 |
| 10,505,881 | B2 * | 12/2019 | Bray | H04L 51/214 |
| 10,735,539 | B1 * | 8/2020 | Robertson | H04L 67/55 |
| 2011/0258136 | A1 * | 10/2011 | Adhiraju | G06Q 30/02 705/342 |
| 2014/0038546 | A1 * | 2/2014 | Neal | G06Q 20/322 455/405 |
| 2014/0244765 | A1 * | 8/2014 | Smith | H04L 51/222 709/206 |
| 2014/0380425 | A1 * | 12/2014 | Lockett | G06F 21/00 726/4 |
| 2015/0058449 | A1 * | 2/2015 | Garg | H04L 67/10 709/219 |
| 2015/0341300 | A1 * | 11/2015 | Swain | G06F 16/287 707/738 |
| 2016/0323122 | A1 * | 11/2016 | Butler | A63F 13/79 |
| 2016/0335653 | A1 * | 11/2016 | Bodington | G06Q 30/0227 |
| 2017/0068706 | A1 | 3/2017 | Bray | |
| 2017/0085512 | A1 * | 3/2017 | Bray | H04L 51/214 |
| 2017/0102830 | A1 * | 4/2017 | Wehrman | G06F 3/04845 |
| 2017/0124569 | A1 * | 5/2017 | Revelle | G06Q 20/401 |
| 2017/0317873 | A1 * | 11/2017 | Hévizi | H04L 41/0681 |
| 2018/0181870 | A1 * | 6/2018 | Osborne | G06N 5/046 |
| 2018/0246955 | A1 * | 8/2018 | He | G06F 16/3344 |
| 2018/0300811 | A1 * | 10/2018 | Wohlstadter | G06Q 20/102 |
| 2018/0302272 | A1 * | 10/2018 | Makovsky | H04L 41/22 |
| 2019/0036698 | A1 * | 1/2019 | Anglin | H04L 9/3236 |
| 2019/0045008 | A1 * | 2/2019 | Murthy | G06F 16/212 |

(Continued)

*Primary Examiner* — James N Fiorillo
(74) *Attorney, Agent, or Firm* — BakerHostetler

(57) ABSTRACT

Implementations for providing event processing services that associate multiple accounts are described. A user of a first account may have rules for event processing that cause the event to be sent to a second account. If a received event satisfies the rule, the event may be processed for the first account and processed for the second account using a single processing node and/or single rule evaluation sequence.

20 Claims, 14 Drawing Sheets

(56) References Cited

U.S. PATENT DOCUMENTS

| | | | |
|---|---|---|---|
| 2019/0236552 A1* | 8/2019 | Rouseau | G06Q 40/125 |
| 2019/0364130 A1* | 11/2019 | Rogynskyy | H04L 43/062 |
| 2019/0370089 A1* | 12/2019 | Patton | G06F 9/542 |
| 2020/0050611 A1* | 2/2020 | Patton | G06F 16/254 |
| 2020/0076813 A1* | 3/2020 | Felice-Steele | H04L 63/18 |
| 2020/0118155 A1* | 4/2020 | Bloy | G06Q 30/0215 |
| 2020/0125725 A1* | 4/2020 | Petersen | H04L 43/065 |
| 2021/0150489 A1* | 5/2021 | Haramati | G06F 16/252 |
| 2021/0287156 A1* | 9/2021 | Rogynskyy | G06F 16/122 |
| 2021/0320794 A1* | 10/2021 | Auh | H04L 9/0836 |
| 2022/0083740 A1* | 3/2022 | von der Heyde | G06F 16/322 |

* cited by examiner

RULE PROCESSING FOR CROSS-ACCOUNT EVENT ASSOCIATION

BACKGROUND

A computing system generates events for a variety for reasons. Some users may attempt to track these events to diagnose problems, track information, and perform other analytics. To that end, an event service for processing events from a variety of sources is often used and is sometimes referred to as an event bus. Some systems, however, may deploy much more sophisticated event processing schemes that rely on multiple event services. These event services, however, process events in a siloed fashion without coordination resulting in inefficiencies.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Disclosed herein are processes for event handling, such as using event services in which users can place events. An event service may allow users of different accounts to establish separate event service processes that receive events for a specific account. The event service may process events received for the account using a set of rules associated with the account. Customers of a services platform may be able to associate different accounts so that accounts can share events from one account to another.

A typical event service implementation may perform processing for two accounts separately. If one account causes an event to be sent to another account, the same event travels through a data plane or event processing system twice. This is wasteful, requires the data plane to scale for double the traffic, and has the risk of causing invocation loops.

The disclosed techniques address these issues, at least in part, resulting in improved efficiency of data resources. Events for a first account are processed using rules associated with the first account. A rule for the first account may indicate a second account as a target for the event. If an event matches the rule indicating the second account as the target, all the rules for the second account may be fetched and processed for the second account without having to send the event a second time through the initial process that assigns events to different accounts. This process can be performed repeatedly (e.g., for multiple accounts) until the end of a chain of associated accounts is reached, the event fails to match a rule for the second account, or when a loop of processing an event is detected.

The disclosed techniques reduce the number of events being processed through an event processing system (e.g., reducing traffic for cross-account associations by about half) and enables support of more than single hop cross-account delivery. For example, if an event does not match any of the rules of second account during the processing related to the first account, there is no need to send the event back through intake of the event processing system for the second account. Invocation loops (e.g., loops of initiating tasks due to event rule matching) due to cross-account cases may also be checked during the rule processing. These techniques also allow for cross-region rule matching at the source.

Figure 1:
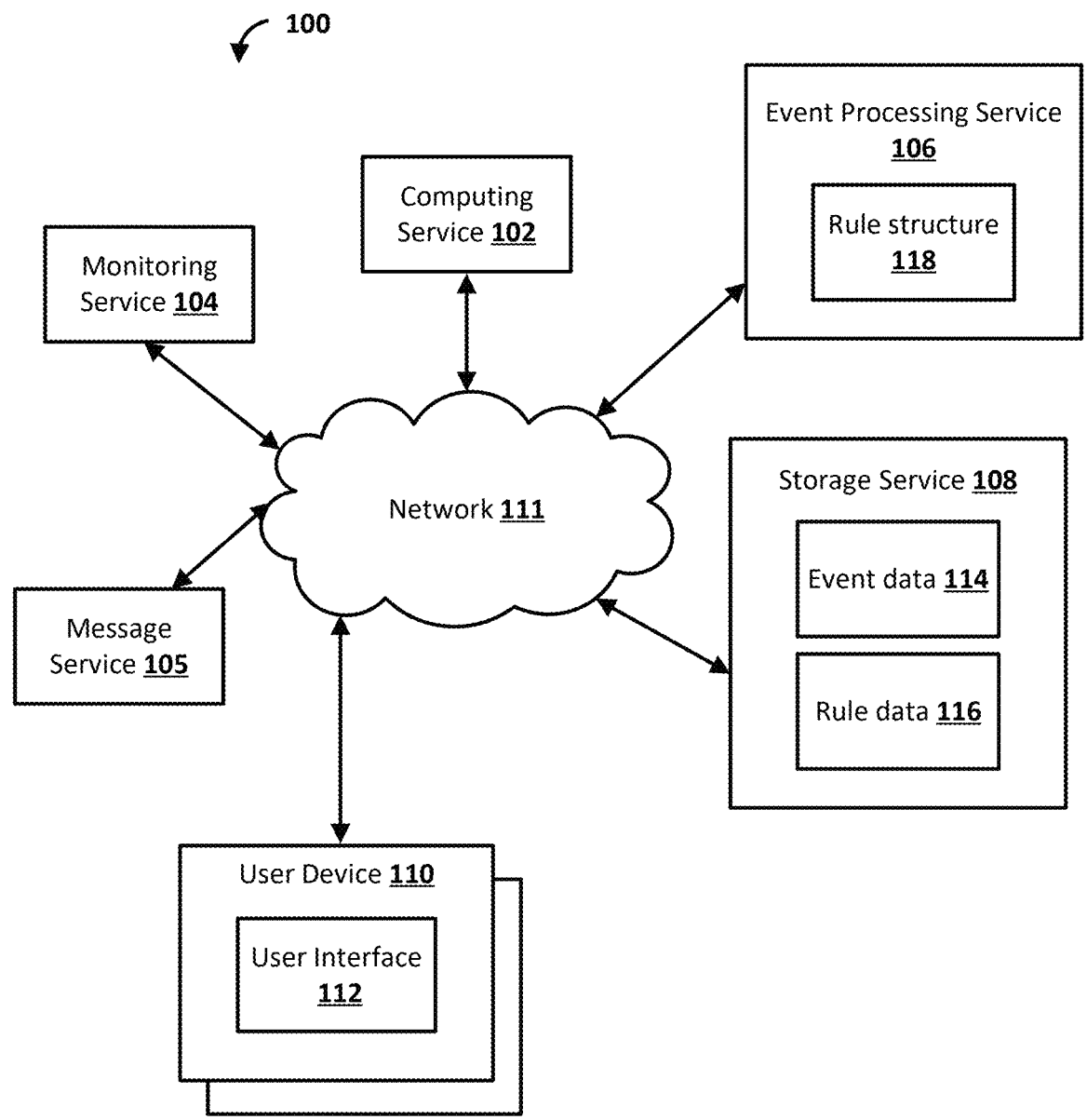
FIG. 1 is a diagram illustrating an example computing system for implementing an event service.

FIG. 1 is a diagram illustrating an example computing system 100 for providing one or more services. The one or more services may comprise a computing service 102, a monitoring service 104, a message service 105, an event processing service 106, a storage service 108, or a combination thereof. The computing service 102, the monitoring service 104, the event processing service 106, the storage service 108, or a combination thereof may be part of a services platform, such as a web services platform. The services platform may provide network based services that are geographically dispersed (e.g., external to user premises). The services platform may provide the one or more services to one or more user devices 110.

The system 100 comprises a network 111. The network 111 is configured to communicatively couple one or more of the services platform, the computing service 102, the monitoring service 104, the message service 105, the event processing service 106, the storage service 108, the user device 110, and/or the like. The network 111 may also comprise a plurality of network devices, such as routers, switches, access points, switches, hubs, repeaters, modems, gateways, and/or the like. The network 111 may comprise wireless links, wired links, a combination thereof, and/or the like.

The one or more user devices 110 comprise a computing device, such as a mobile device, a smart device (e.g., smart watch, smart glasses, smart phone), a computing station, a laptop, a workstation, a tablet device, and/or the like. In embodiments, the one or more user devices 110 are configured to output one or more user interfaces 112, such as a user interface associated with the computing service 102, a user interface associated with the monitoring service 104, a user interface associated with the event processing service 106, or a user interface associated with the storage service 108, and/or the like. The one or more user interfaces are output by an application, such as desktop application, a mobile application, a browser application, a content browser, a web browser, and/or the like.

The computing service 102 is configured to provide one or more computing nodes, such as computer processors, virtual machines, computing devices, and/or the like. The computing service 102 may be used to implement a variety of services for the services platform, such as a web hosting service, database service, cloud computing services, analytic services, blockchain services, application programming interface services, developer services, machine learning services, security services, serverless hosting, business application services, gaming services, content services, and/or the like.

The monitoring service 104 is configured to monitor any of the services (e.g., or resources) of the services platform. The monitoring service 104 may be configured to determine events associated with the monitored services. In embodiments, monitoring the services of the services platform includes monitoring one or more service logs, monitoring one or more service metrics, monitoring data streams, and/or the like. The monitoring may compare performance metrics, usage metrics, and/or other suitable data relating to the operation of the services to predetermined thresholds and/or alarms. The result of the comparison may cause an event to be generated. In embodiments, the monitoring service 104 may generate events that describe changes to services in the services platform (e.g., resource changes). If a particular type of state change has occurred in a service (e.g., or resource), the monitoring service 104 may generate one or more events. If a threshold (e.g., or alarm) is reached, the monitoring service 104 may generate an event.

The monitoring service 104 may use agent software or any other suitable techniques to monitor individual services. An agent may be configured to monitor a particular type of service of the services platform. The services monitored by the monitoring service 104 may generate events that may be detected by the monitoring service 104. The monitoring service 104 may detect the events generated by the service and cause a corresponding event to be generated (e.g., or store the original event).

The monitoring service 104 may cause the detected and/or generated events to be stored by the storage service 108 as event data 114. The event data may be sent via the network 111 to the storage service 108. The event data 114 may comprise event data associated with a particular account associated with the event processing service 106. The event processing service 106 may be configured to process events in the event data 114. The event processing service 106 may be configured to process the event data 114 based on an ordering of the events stored in the event data 114. Events that are generated by the monitoring service 104, and/or any other service of the services platform (e.g., computing service 102) may be processed as an event bus, event queue, event stream, and/or the like.

The message service 105 may be configured to send messages, notifications, and/or other data as events to the storage service 108 and/or event processing service 106. The message service 105 may be a stand-alone service or a service integrated into an application. The message service 105 may be external to the services platform or a service of the services platform.

The event processing service 106 may be configured to store rule data 116 for a plurality of accounts. A plurality of users may sign up for corresponding accounts associated with the event processing service 106. A first user may input (e.g., or send via an application programming interface) first rules associated with processing events for a first account. A second user (e.g., or the first user) may input (e.g., or send via an application programming interface) second rules associated with processing events for a second account. At least one rule of the first rules may indicate a second account as a target for sending events.

In embodiments, the services platform is configured to isolate the first account from the second account. The first account may not be able to access event data 114 associated with the second account. The second account may not be able to access event data 114 associated with the first account. The event processing service 106 may be configured to isolate different accounts while accessing rules from both accounts.

The event processing service 106 may be configured to generate one or more rule structures 118 for processing rules for an account. The rule structure 118 for a specific account may be generated (e.g., periodically) based on rules in the rule data 116 associate with the account. The rule structure 118 may be stored in a cache of a computing node associated with a particular account. In embodiments, a rule structure 118 may be generated for processing the first rules. The rule structure 118 may be based on the first rules. The rule structure 118 associated with the first account may allow for processing of the second rules. In some scenarios, the event processing service 106 may be configured to automatically process a second rule structure (e.g., or portion of the rule structure) associated with the second rules if an event matches a rule that indicates the second account as a target (e.g., to send the event to for processing). In some scenarios, the a combined rule structure may be used to process the first rules and the second rules.

In embodiments, the event processing service 106 is configured to generate a first portion of the rule structure 118 (e.g., or a first rule structure) for processing the first rules. The event processing service 106 may be configured to determine (e.g., while generating the first portion of the rule structure) that the second account is indicated as a target for at least one rule of the first rules. The event processing service 106 may be configured to access, based on the determining that the second account is indicated as the target, the second rules. The event processing service 106 may be configured to generate, based on accessing the second rules, a second portion of the rule structure 118 (e.g., or a second rule structure) for processing the second rules. A rule structure 118 may be a combination of multiple rule structures and/or multiple portions of rule structures. The rule structure 118 may be considered a combined rule structure if the rule structure has portions related to different accounts, links together multiple rule structures, and/or the like. A linking, via an association, of two rule structures may be considered a combined rule structure. For example, the first portion of a combined rule structure 118 may comprise a rule structure (e.g., rule machine) based on the first rules, and the second portion of the combined rule structure 118 may comprise a rule structure (e.g., rule machine) based on the second rules (e.g., or a limited portion of the second rules relevant to the first account). In some scenarios, the second account may indicate a portion of the second rules associated with the first account. The rule structure 118 (e.g., or combined rule structure) may be based on portion of the second rules (e.g., and not based on other portions of the second rules). The term combined rule structure as used herein may be used to refer to any number of associated, linked, and/or otherwise logically related rule structures, portions of rule structures, rule machines, and/or the like. Example rule structures are shown in FIGS. 6A-E and described more fully herein.

In embodiments, the event processing service 106 determines the first account has granted permission to send events to the second account. The event processing service 106 may determine that the second account has granted permission to the first account to receive events from the first account. The event processing service 106 may generate the rule structure (e.g., or a second rule structure, second portion of the rule structure) based on the determining that the first account has granted permission to send events to the second account, based on determining that the second account has granted permission to receive events from the first account, a combination thereof, and/or the like.

In embodiments, the rule structure 118 comprises a state machine, such as a finite-state machine. The state machine may be based on the first rules, the second rules, or a combination thereof. In embodiments, the rule structure 118 comprises a combination of a first finite-state machine based on the first rules and a second finite-state machine based on the second rules. It will be appreciated that such a rule structure could be extended based on additional rules (e.g., additional rules from a third finite-state machine, fourth finite-state machine, etc.). The rule structure 118 may be based on rule patterns of the first rules and the second rules. The rule structure 118 may comprise one or more of a hash table or a tree structure.

The event processing service 106 may be configured to receive data indicative of an event for a first account of the services platform. The event processing service 106 may receive an indication that the event data 114 for a first account has been updated. The event data 114 may be updated if an event is added (e.g., by the monitoring service 104, the computing service 102) to the event data 114. The event processing service 106 may periodically poll the event data 114 to determine that the event is added.

The event processing service 106 may be configured to determine (e.g., access, generate) a rule structure 118 associated with the event. If the event is associated with a first account, the event processing service 106 may determine (e.g., or access, generate), a rule structure associated with the first account. The rule structure 118 may be associated with a first account, a second account, and/or the like. The rule structure 118 may be for processing first rules associated with the first account. If the first rules associated with the first account indicate that the second account is a target of a rule, the rule structure associated with the first account may be configured for processing second rules associated with the second account (e.g., in addition to be configured to process the first rules). If the first rules associated with the first account indicate that the second account is a target of a rule, the event processing service 106 may be triggered to a access a portion of the rule structure (e.g., or a second rule structure, which may be stored with the first rule structure) associated with processing the second rules of the second account.

The event processing service 106 may be configured to process, based on the rule structure 118, the event for the first account. In some scenarios, processing the event for the first account comprises modifying the event. Modifying the event may comprise modifying, adding, and/or removing one or more fields of the event. Modifying the event may comprise changing the event from one format to another format. Processing the event for the first account may determine that second account is a target for sending the event. The event processing service 106 may be configured to process, based on the rule structure (e.g., and based on the second account being determined as the target), the event for the second account. If the event is modified during processing for the first account, processing the event for the second account may comprise processing the modified event, an intermediate version of the modified event, or the event as originally received.

As an example, the system 100 may be configured to implement processing events using a single account and rule set for a specific purpose. A plurality of accounts for event processing may have a single account that is used for a specific type of event processing. The event processing may comprise security event processing. The plurality of accounts may send events to a second account configured with security rules. The rules may check for invalid access, corrupted data, abnormal events, and/or the like. This allows a user to implement a single security solution for a variety of different accounts and services of the services platform (e.g., or external services).

As another example, the system 100 may be configured to implement an asynchronous processing system, such as a purchasing system. One event may be processed in multiple stages, such as stages of a business process. A first account may have rules associated with intake of a product order. A second account may have rules associated with billing. A third account may have rules associated with shipping. The first account may have rules that send the event as a target to the second account and/or third account. The second account may have rules that send the event as a target to the third account and/or another account.

As another example, the system 100 may be configured to perform event processing for multiple associated accounts. In order for events to be delivered from account A to account B the following setup may be implemented. The user/owner of Account B (receiver) may be required to give permission to receive events from account A to be able to receive events from account A. The user/owner of count A (sender) may be required to create a rule that has account B (e.g., or the account bus of account B) as a target.

As another example, the system 100 may be configured to perform centralized event processing for multiple different event processing accounts. For example, centralized monitoring of API calls may be configured. Events from several different accounts may be centrally logged to one central account. A DevOps team may manage all event information downstream using a central event processing account. The different services configure their event processing accounts with rules that send events to the DevOps event processing account (e.g., event buses). Service teams may collaborate with DevOps teams to coordinate resource needs. Any new rules, filters or target configurations may be implemented and managed by the DevOps team.

As another example, the system 100 may be configured to use a single event processing account to send events to multiple different event processing accounts. This configuration may reduce the chances of a single point of failure during event delivery. This may allow for separate responsibility between event publishers and event delivery. Having multiple accounts provides services with a blast radius, security boundaries, and allows easily tracking of service costs. A single service may be configured to trigger multiple other services via cross-account event processing if each service has its own associated account.

Figure 2:
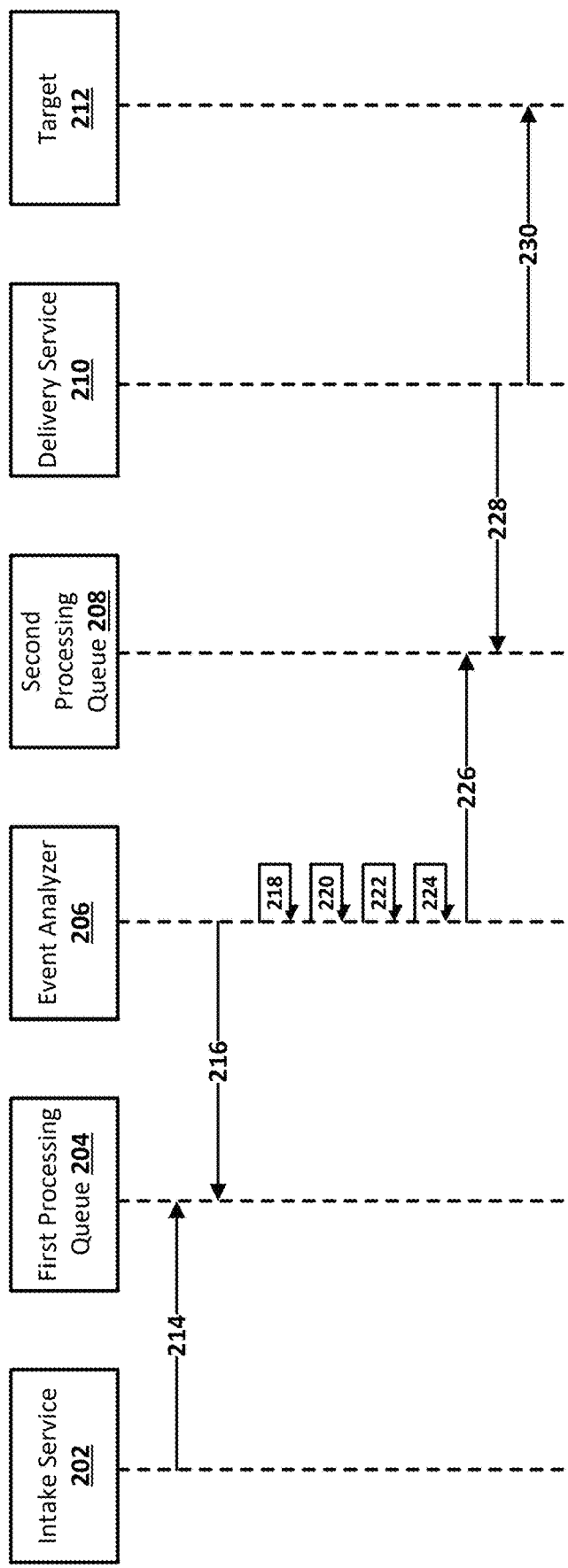
FIG. 2 is a process diagram showing an example process for events.

FIG. 2 is a process diagram showing an example process for events. The process may be performed by the event processing service 106. The process comprises an intake service 202 (e.g., a front-end service), a first processing queue 204, an event reader 206, a second processing queue 208, a delivery service 210, and a target 212. It should be noted that the first processing queue 204 and the second processing queue 208 may be optional.

At 214, the intake service 202 (e.g., a web service) sends a message to the first processing queue 204. The message may comprise an instruction to add an event to the first processing queue 204. The event may be an event received from a service (e.g., monitoring service 104) of a services platform.

At 216, the event analyzer 206 sends a message to the first processing queue 204. The message may comprise a poll request. The poll request may request any un-processed events associated with an event processing service. The event analyzer 206 may receive an event (e.g., or data indicative of an event) from the first processing queue 204. The event may be associated with a first account of an event processing system.

At 218, the event analyzer 206 determines if the event matches any rules associated with the first account. The event analyzer 206 may access a rule structure associated with the first account. The rule structure may comprise one or more rule machines, one or more sets of rules, one or more converted rule sets, and/or the like. The rule structure may have a first portion (e.g., first rule machine) associated with first rules of the first account. If the event matches any rules of the first account, any actions associated with the matched rules may be executed. Example actions may comprise modifying the event, sending the event to a target, a combination thereof, and/or the like. If the first account has any rules that have a second account as a target, the rule structure may comprise a second portion (e.g., second rule machine) associated with processing second rules of the second account.

At 220, the event analyzer 206 accesses the second portion of the rule structure (e.g., or a second rule structure). Processing the first portion of the rule structure may have indicated that the event matched a rule that had the second account as a target. Instead of sending the event (e.g., or processed/modified event) back to the first processing queue 204 for processing the event for the second account, the event analyzer 206 may obtain, download, and/or otherwise access the second portion of the rule structure (e.g., or the second rule structure).

At 222, the event analyzer 206 checks for permissions associated with the first account and/or second account. The event analyzer 206 may determine that the first account has given permission for the second account to access events from the first account. The event analyzer 206 may determine that the second account has given permission to receive events from the first account. If one or more of these permissions are determined to be granted, then the event analyzer 206 may process the second portion of the rule structure to process rules associated with the second account. Processing the second portion of the rule structure may result in modification of the event received for the second account. Processing the second portion may result sending the event, a modified version of the event, or other message to one or more targets (e.g., target services, storage service, processing service, logging services, analytics services).

At 224, metering and/or metrics may be determined. A charge may be associated with sending events from one account to another for processing events using the event processing service. Other metrics may be determined, such as processing time, storage usage, and/or the like.

At 226, the event analyzer 206 sends a message to the second processing queue 208. The message may comprise an indication of the original event, the event processed based on the first portion of the rule structure, the event processed based on the second portion of the rule structure, other messages, a combination thereof, and/or the like. The message may comprise an indication of a target for the event. The target may be target identified from processing using the first portion of the rule structure, a target identifier from processing using the second portion of the rule structure, a combination thereof, and/or the like.

At 228, the delivery service 210 polls the second processing queue 208 for any tasks to execute. The task executor determines that the event is tasked to be send to the target 221. At 330, the task executor processes the task to cause the event to be sent to the target 221.

Figure 3:
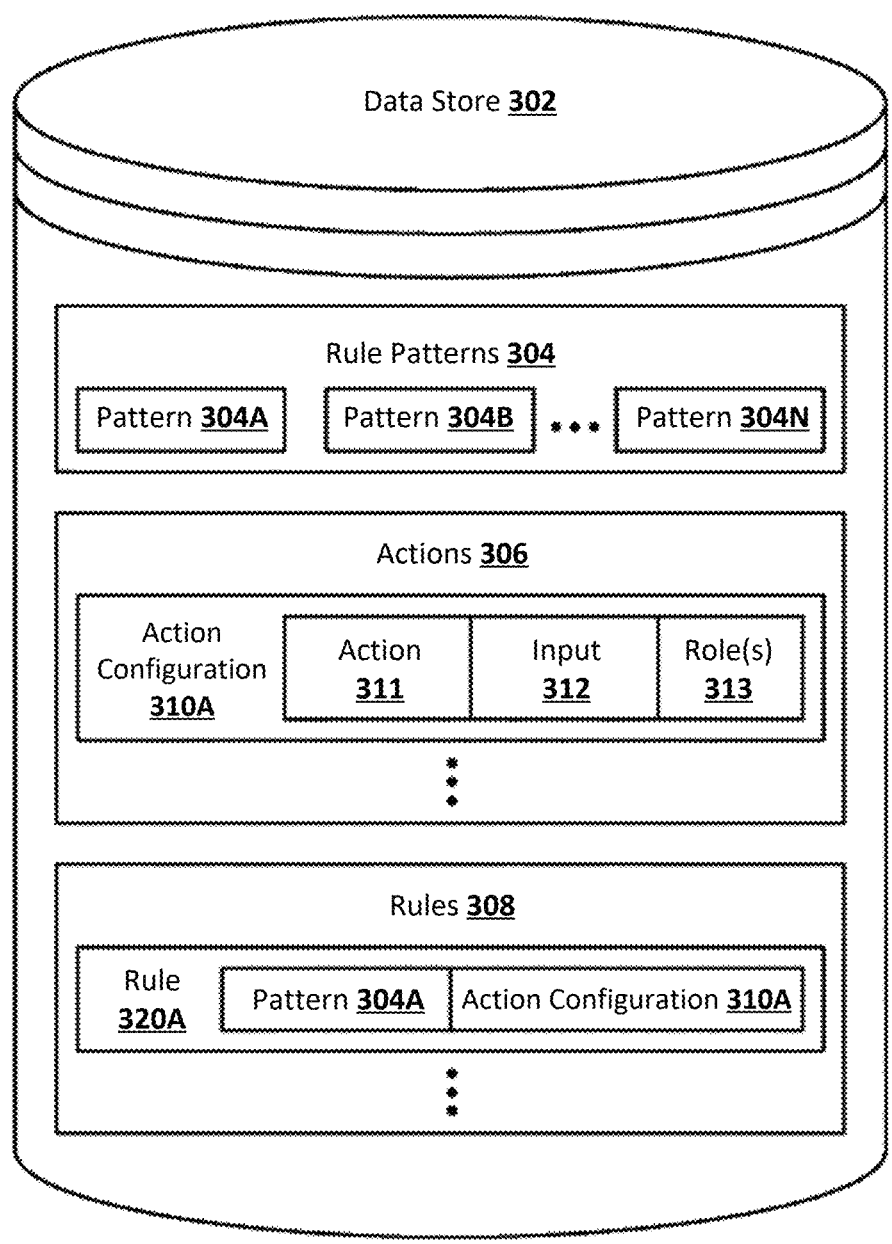
FIG. 3 is a diagram showing an example rules for processing events.

FIG. 3 is a block diagram showing details associated with rules. An example system comprises a data store 302. The data store may be a data store, database, data structure, and/or the like managed by the storage service 108 of FIG. 1. The data store 302 may store rule patterns 304, actions 306, and rules 308. In the example shown in FIG. 3, the rule patterns 304 may include rule patterns 304A and 304B through 304N. However, it is contemplated that any suitable number of rule patterns may be stored in the data store 302. A user may access an account and define the rules 308 using the rule patterns and rule actions.

In the example shown in FIG. 3, the actions 306 may include an action configuration 310A and one or more additional action configurations (not shown). Each action configuration (such as action configuration 310A) may include an action (such as action 311), any inputs for the action (such as input 312), and any roles (such as role(s) 313) needed for the action. An action may include one or more commands, instructions, or other invocations of functionality to perform one or more tasks. An action may be associated with inputs such as event-specific data to be supplied to the action. An action may be associated with inputs such as default parameters that apply to all invocations of the action. In embodiments, run-time input parameters may also be specified for a particular instance of an action when the action is invoked. In embodiments, the run-time input parameters may augment but not override the default parameters. For example, if an action involves resizing an image file when the image file is added, then the default parameters may include a target width and height, and the run-time input parameters may include the storage location of the image file. A role may include permissions or other security credentials that permit the action to have access to a set of resources at run-time. A role may be independent of any particular user or group of users and may represent a delegation of authority to the associated action.

In the example shown in FIG. 3, the rules 308 may include a rule 320A and one or more additional rules (not shown). The rule 320A may specify one of the rule patterns, such as rule pattern 304A, and one of the action configurations, such as action configuration 310A. When the rule pattern 304A is matched, the event processing service 106 (e.g., the rule evaluator 470) shown in FIG. 4) may use the data store 302 to determine that the rule pattern 304A is part of rule 320A. The event processing service 106 may also use the data store 302 to determine that the action configuration 310A is also part of the rule 320A. e.g., is linked to the rule pattern 304A. The event processing service 106 may then cause the specified action 311 to be performed with the input 312 (and optionally run-time input parameters) and using the role(s) 313. In embodiments, the event processing service 106 may generate a message specifying the action 311, the input 312 (including, for example, any default parameters and/or run-time input parameters), and the role(s) 313.

In embodiments, the rules 308 may include a mapping of rule patterns to actions. For example, a first rule may represent a binding of a rule pattern to a first action configuration, and a second rule may represent a binding of the same rule pattern to a second action configuration. When the rule pattern is matched, the event processing service 106 may use the data store 302 to determine that the rule pattern is part of both the first and second rules. The event processing service 106 may also use the data store 302 to determine that the first action configuration is part of the first rule and that the second action configuration is part of the second rule. The event processing service 106 may then cause the actions specified in both action configurations and to be performed. In embodiments, the event processing service 106 may generate one or more messages specifying the actions, the input associated with the actions, and any necessary role(s).

In embodiments, the rules 308 may include a mapping of rule patterns to actions and/or a mapping of rule patterns to queue exchanges. For example, a first rule may represent a binding of a rule pattern to an action configuration. The action configuration may indicate a target (e.g., target service, target resource, target queue, target event stream) for an event. A second rule may represent a binding of the same rule pattern to a queue exchange. The queue exchange may specify one or more queue messages to be generated. When the rule pattern is matched, the event processing service 106 may use the data store 302 to determine that the rule pattern is part of the first and second rules. The event processing service 106 may also use the data store 302 to determine that the action configuration is part of the first rule and that the queue exchange is part of the second rule. The event processing service 106 may then cause the action specified in the action configuration to be performed. In embodiments, the event processing service 106 may generate one or more messages specifying the actions, the input associated with the actions, and any necessary role(s). Additionally, the event processing service 106 may generate a queue message as specified by the queue exchange and place that message in a queue or otherwise send the message to a messaging service. For example, the queue message may represent a notification (e.g., to an administrator or log) that the rule pattern was matched at a particular time or that the action in the action configuration was performed with particular parameters and at a particular time.

Figure 4:
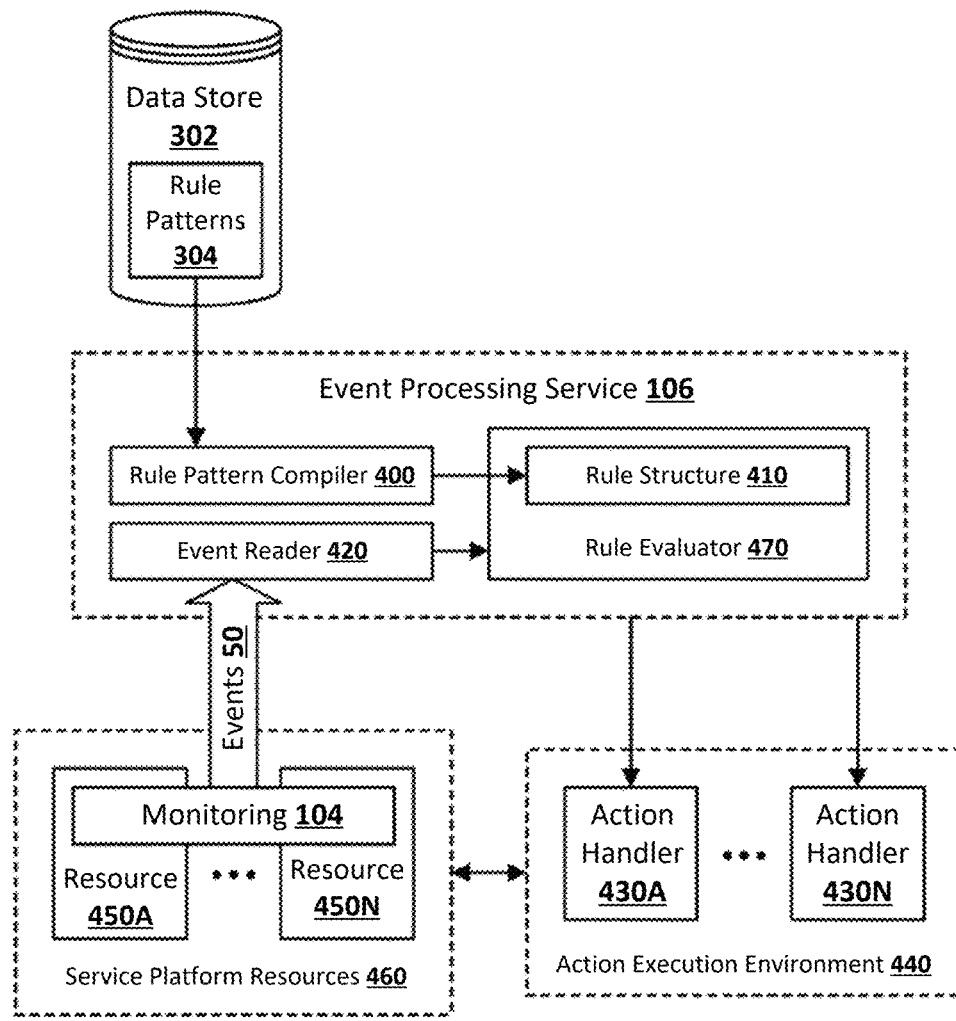
FIG. 4 is a diagram showing example details of an event processing service.

FIG. 4 illustrates an example system environment for event-stream searching using compiled rule patterns, according to some embodiments. In embodiments, the monitoring service 104 may generate a plurality of events 50, and the event processing service 106 may evaluate a compiled form of the rule patterns 304 against the events to determine which events (if any) match any of the rule patterns. The events may represent or indicate changes to resources (such as resources 450A-450N) of the service platform resources 460. The monitoring service 104 may monitor any of the resources, e.g., during operation and/or use of the resources, and it may detect resource changes using any suitable monitoring techniques. For example, the monitoring service 104 may use agent software or any other suitable techniques to monitor individual resources. In embodiments, monitoring the resources in the provider network may include monitoring one or more service logs, monitoring one or more service metrics, and/or monitoring any suitable data streams. The monitoring service 104 may generate events 50, and each event may describe one or more changes to one or more resources. Examples of formats for events are discussed below with reference to FIG. 5.

The monitoring service 104 may use any suitable techniques to convey the events 50 to the event processing service 106. In embodiments, the monitoring service 104 may place the events 50 in storage associated with an account (e.g., associating the event with an event bus, queue, or other ordered process). The storage (e.g., or event bus) may be used to deliver a stream of events, such that different events are placed in the storage (e.g., or event bus) and/or ready for delivery at different times. The event processing service 106 may comprise an event reader 420) that receives events, such as by reading the events from the storage (e.g., or event bus or other stream). In embodiments, clients of the services platform may also supply events to the event reader 420, e.g., by placing the events in storage (e.g., for an event bus or other stream). In embodiments, the storage may represent and/or be used to implement a single event bus or stream or multiple event buses or streams. The storage may be used to deliver events 50 to the event processing service 106 for evaluation of potential matches with rule patterns. For example, the storage (e.g., or event bus) may be divided into a plurality of shards, and each shard may be associated with one or more event readers.

As discussed above with respect to FIG. 3, a rule may be defined to include one or more rule patterns and one or more actions and/or message exchanges. A rule pattern may represent one or more conditions that, when satisfied, may cause the event processing service 106 to invoke any actions associated with any corresponding rules. The events 50 may describe conditions for resources (e.g., services) associated with the services platform. The event processing service 106 may evaluate a compiled form of the rule patterns 304 against the events to determine which events (if any) describe conditions corresponding to any of the rule patterns 304. Accordingly, the event processing service 106 may evaluate a compiled form of the rule patterns 304 against the events to determine which events (if any) match the rule patterns 304. The compiled form of the rule patterns 304 may comprise one or more rule structures, such as one or more state machines, linked state machines, and/or the like.

The event processing service 106 may include a rule compiler 400. Using the rule compiler 400, the event processing service 106 may compile or otherwise generate one or more rule structures 410 (e.g., or rule base) based (at least in part) on the rule patterns 304. As used herein, the term compilation generally includes the transformation of rules or portions thereof (such as rule patterns that describe conditions) into another format. The compiled rule structure 410 may include any suitable program instructions and/or data to capture or otherwise describe a set of one or more rule patterns in a manner that permits efficient evaluation of the rule patterns against events. In embodiments, the rule structure 410 may capture the set of rule patterns defined by or for a particular client of the services platform rather than all the rule patterns (e.g., or all the rule data 116) in the data store 302 of the storage service 108. The rule structure 410 may also be referred to as a machine object.

In embodiments, the rule structure 410 may comprise (e.g., or represent) a finite-state machine. The finite-state machine may comprise (e.g, or represent) a directed graph in which nodes represent finite states and edges represent transitions between those states. The finite-state machine may be in only one of the finite states at any particular time. The finite-state machine may transition between these states when conditions in events match conditions in rule patterns. An example of such a finite-state machine is discussed below with respect to FIGS. 6A-E.

In embodiments, the event processing service 106 may include a rule evaluator 470. Using the rule evaluator 470, the event processing service 106 may evaluate the rule structure 410 against the events 50 to determine which events (if any) match any of the rule patterns captured in the rule structure 410. As used herein, the matching of an event to a rule pattern (or vice versa) generally indicates that conditions described in an event satisfy the conditions associated with one or more rule patterns. Accordingly, it may be said that the rule structure 410) represents or captures the rule patterns associated with one or more rules, and the rule evaluator 470 may evaluate the rule base against the events to determine which events (if any) match any of the rule patterns in the rule structure 410. In embodiments, the events 50 used as input to the rule evaluator 470 may represent events for resources (e.g., services) associated with a particular account of the services platform (e.g., or an account of the event processing service 106), e.g., the same client (e.g., or account) whose rule patterns are compiled into the rule structure 410. Accordingly, aspects of the event processing service 106, such as the rule evaluator 470 and/or event reader 420, may be implemented on a per-client (e.g., or per account) basis.

When an event matches a rule pattern, the event processing service 106 may invoke or cause to be performed any actions specified in any rules that include the rule pattern. In embodiments, the event processing service 106 may send suitable information (including all or part of an event matching a rule pattern as well as other parameters for any related actions) to one or more action handlers (e.g., task executors), such as action handlers 430A-430N, in an action execution environment 440). The actions performed by the action handlers 430A-430N may include any suitable modification and/or configuration of any of the resources 450A-450N and/or their constituent elements. In embodiments, the rule evaluator 470 may modify an event that matches a rule pattern and then store and/or forward the modified event.

Figure 5:
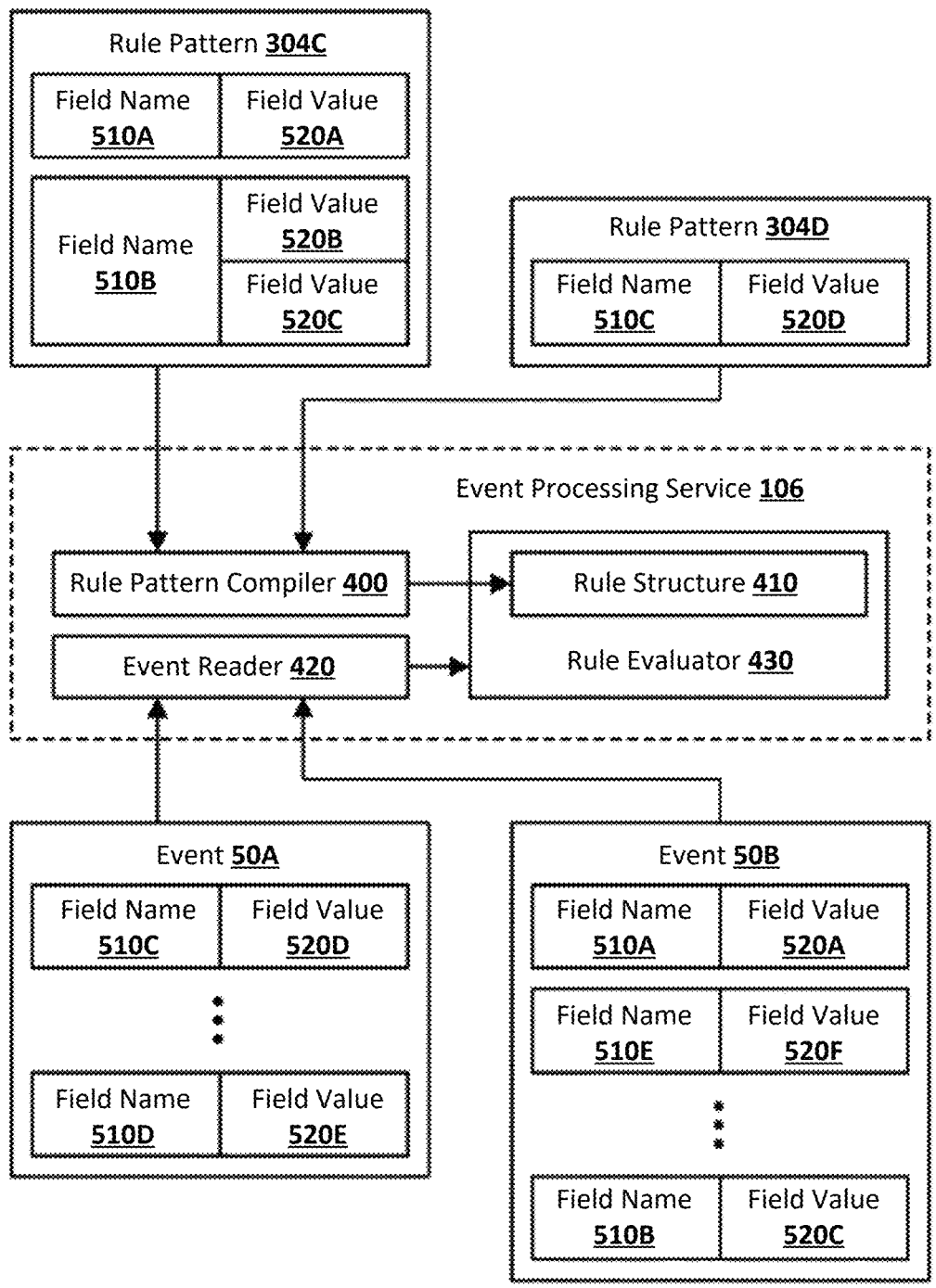
FIG. 5 is a diagram showing example processing of events.

FIG. 5 illustrates further aspects of the example system environment for event-stream searching using compiled rule patterns, including examples of events that match particular rule patterns, according to some embodiments. Rule patterns 304C and 304D represent examples of rule patterns that may be compiled into the rule structure 410. Each rule pattern may include one or more field names. For each field name, the rule pattern may include one or more field values. For example, rule pattern 304C may include a first field name 510A and an associated field value 520A. Rule pattern 304C may also include a second field name 510B and two associated field values 520B and 520C. Field names and their associated values may generally describe characteristics or attributes of resources (e.g., services) of the service platform resources 460. In some cases, a field name may include a nested or otherwise hierarchical structure that may be flattened during compilation of the rule patterns. The event processing service 106 may evaluate potential matches based on arbitrary or user-defined Boolean combinations of field names and/or field values. For example, in embodiments, for the rule pattern 304C to be matched by an event, all of the field names 510A and 510B should be present in the event; however, any one of the field values for a field name (e.g., either value 520B or value 520C for name 510B) may satisfy the conditions represented by the rule pattern. As another example, rule pattern 304D may include a field name 510C and an associated field value 520D. In embodiments, for the rule pattern 304D to be matched by an event, the field name 510C and associated field value 520D should be present in the event.

Events 50A and 50B represent examples of events that may be used as input into the rule evaluation 430. Each event may include one or more field names. For each field name, the event may include one or more field values. For example, event 50A may include a field name 510C and associated field value 520D as well as a field name 510D and associated field value 520E. Field names and their associated values in events 50 may generally describe characteristics or attributes of resources (e.g., services) of the service platform resources 460. In some cases, a field name in an event may include a nested or otherwise hierarchical structure that may be flattened prior to rule evaluation against the event. The event 50A may also include other field names (not shown), as indicated by the ellipsis. As another example, event 50B may include a field name 510A and associated field value 520A, a field name 510E and associated field value 520F, and a field name 510B and associated field value 520C. The event 50B may also include other field names (not shown), as indicated by the ellipsis.

In embodiments, example events 50A and 50B may be represented initially using a structured, hierarchical format such as JSON or XML. In such a format, the events 50A and 50B may include nested structures such that some field names may be represented by different name components across different levels of the hierarchy. Prior to evaluating such events, event processing service 106 may flatten the events and sort the field names within the events. For example, flattening the event 50A or 50B may include extracting the field names (with their associated values) from a hierarchy or other structured format in the event and placing them in a flattened event. The field names within a flattened event may then be sorted and reordered using any suitable basis (e.g., alphabetically) to generate a flattened and sorted event.

Rule patterns 304 may also be represented initially using a structured, hierarchical format such as JSON or XML. Accordingly, the example rule patterns 304C and 304D may also be flattened and have their field names sorted on the same basis as the events. For example, rule pattern 304C may initially be defined as follows:

```
{
    "detail-type":["ec2/spot-bid-matched"],
    "detail": {
        "state":["in-service", "stopped"]
    }
}
```

In embodiments, the initial definition of rule pattern 304C may be flattened to produce the following rule, where "detail-type" represents field name 510A, "ec2/spot-bid-matched" represents field value 520A, "detail.state" represents field name 510B, and "in-service" and "stopped" represent field values 520B and 520C:

"detail-type", "ec2/spot-bid-matched", "detail.state", "in-service", "detail.state",
"stopped"

As another example, rule pattern may initially be defined as follows:

```
{
    "detail":{
        "state":["pending"]
    }
}
```

In embodiments, the initial definition of rule pattern 304D may be flattened to produce the following rule, where "detail.state" represents field name 510C and "pending" represents field value 520D:

"detail.state", "pending"

In embodiments, the rule evaluation 430 may examine each event only for field names matching one or more rule patterns and may disregard other field names present in the event. For example, when the event 50A is received, the rule evaluation 430 may evaluate the rule patterns 304C and 304D against the event using the rule structure 410. The event 50A may match the rule pattern 304D because the event includes the field name 510C and associated field value 520D described in the rule pattern. In embodiments, once the name 510C and value 520D are found in the event 50A, the rule evaluation 430 may determine that the rule pattern 304D has been matched by the event. The rule evaluation 430 may determine that the rule pattern 304C is not matched by the event 50A once the names 510A and 510B are not found in the event. If the rule base captures only the rule patterns 304C and 304D, then the rule evaluation 430 may examine the event 50A only for field names 510A. 510B, and 510C and disregard other field names in the event (such as name 510D).

As another example, when the event 50B is received, the rule evaluation 430 may evaluate the rules patterns 304C and 304D against the event using the rule structure 410. The event 50B may match the rule pattern 304C because the event includes the field name 510A and associated field value 520A described in the rule pattern as well as the field name 510B and one of the associated field values 520C described in the rule pattern. In embodiments, once the names 510A and 510B and associated values are found in the event 50B, the rule evaluation 430 may determine that the rule pattern 304C has been matched by the event. The rule evaluation 430 may determine that the rule pattern 304D is not matched by the event 50B once the name 510C is not found in the event. If the rule base captures only the rule patterns 304C and 304D, then the rule evaluation 430 may examine the event 50B only for field names 510A, 510B, and 510C and disregard other field names in the event (such as name 510E).

Field names and field values may be defined arbitrarily by users and/or resources. In some scenarios, event processing service 106 may operate without reference to any schemas for rule patterns and events. The internal sorting of the rule patterns and events by field name may permit an efficient evaluation of the rule structure 410 against the events. In embodiments, the evaluation may be implemented such that performance of the evaluation may not vary substantially based on differences in the number of rule patterns (e.g., the evaluation may be an O(1) operation in terms of the number of rule patterns). In embodiments, the evaluation may be able to process hundreds of thousands of events per second.

Figure 6A:
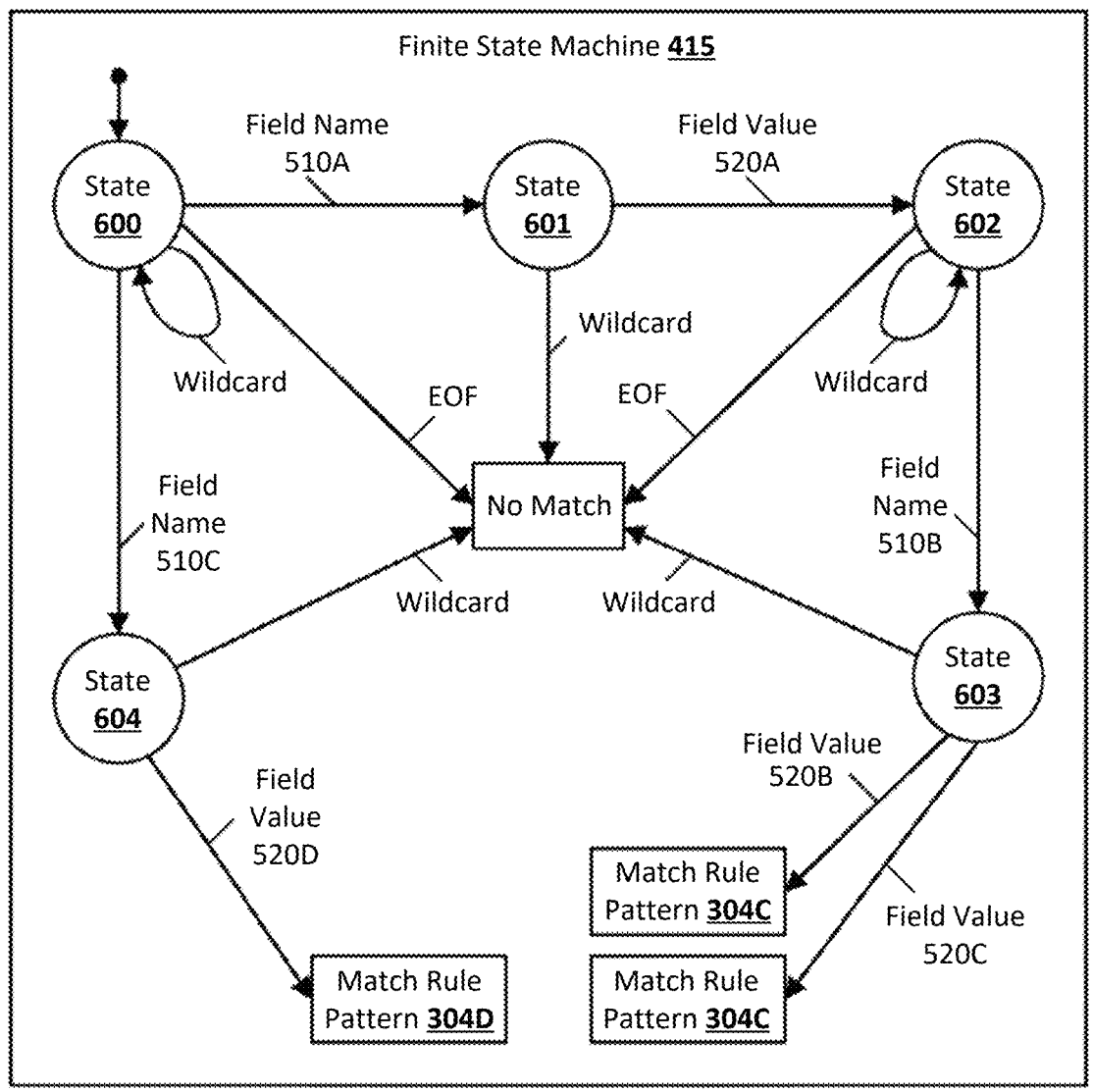
FIG. 6A is a diagram showing an example rule structure.

FIG. 6A illustrates an example of a finite-state machine usable for event-stream searching using compiled rule patterns, according to some embodiments. As discussed above, the rule structure 410 may comprise (e.g., or represent, be indicative of) a finite-state machine 415. The finite-state machine 415 may comprise (e.g., or represent, be indicative of) a directed graph in which nodes represent finite states and edges represent transitions between those states. The finite-state machine 415 may be in only one of the finite states at any particular time, and the finite-state machine may transition between these states when conditions in events match conditions in rule patterns. The example of the finite-state machine 415 may include states such as initial state 600 (also referred to as a start state) and subsequent or additional states 601, 602, 603, and 604. Each of the states 600-604 may be implemented using a hash table for efficient matching of tokens. The finite-state machine 415 may be compiled based on the rule patterns 304C and 304D.

When evaluation of the rule patterns against a particular event is initiated, the finite-state machine 415 may begin in the initial state 600. While the finite-state machine 415 is in the initial state 600, the evaluation may proceed through the sorted field names in the event until the name 510A or name 510C is encountered or until the end of file (EOF) is encountered in the event. If EOF is encountered in state 600, then the evaluation may determine that the event does not match any of the rule patterns 304C or 304D, and the finite-state machine 415 may be exited. Any field name other than names 510A and 510C may represent an implicit wildcard, and the finite-state machine 415 may stay in the initial state 600 if such a field name is encountered in the event. If the field name 510A is matched in the event while in state 600, then the match may cause a transition from state 600 to state 601. In state 601, if any field value other than value 520A is encountered, then the evaluation may determine that the event does not match the rule pattern 304C. If the field value 520A is matched in the event while in state 601, then the match may cause a transition from state 601 to state 602.

While the finite-state machine 415 is in the state 602, the evaluation may proceed through the sorted field names in the event until the name 510B is encountered or until the end of file (EOF) is encountered in the event. If EOF is encountered in state 602, then the evaluation may determine that the event does not match the rule pattern 304C. Any field name other than name 510B may represent an implicit wildcard, and the finite-state machine 415 may stay in the state 602 if such a field name is encountered in the event. If the field name 510B is matched in the event, then the match may cause a transition from state 602 to state 603. In state 603, if any field value other than value 520B or 520C is encountered, then the evaluation may determine that the event does not match the rule pattern 304C. If the field value 520B or 520C is matched in the event while in state 603, then the evaluation may determine that the event matches the rule pattern 304C.

If the field name 510C is found in the event while in state 600, then the match may cause a transition from state 600 to state 604. In state 604, if any field value other than value 520D is encountered, then the evaluation may determine that the event does not match the rule pattern 304D. If the field value 520D is matched in the event while in state 604, then the evaluation may determine that the event matches the rule pattern 304D.

Figure 6B:
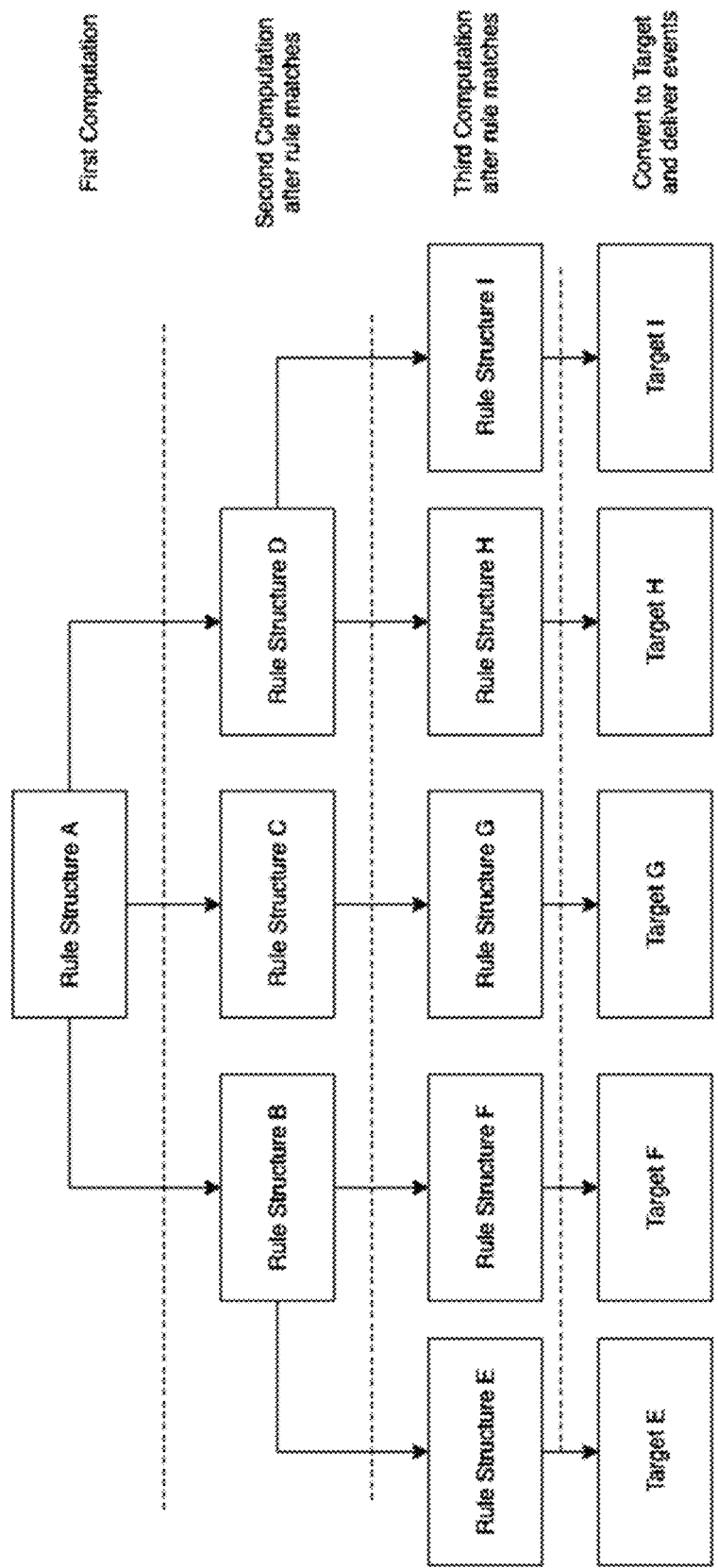
FIG. 6B is a diagram showing relationships of a plurality of rule structures.

FIG. 6B is a diagram showing relationships of a plurality of rule structures. The plurality of rule structures may be considered as separate rule structures or as one rule structure comprising a plurality of rule structure portions. The plurality of rule structures and/or rule structure portions may be logically related. The plurality of rule structures may be organized as a hierarchy of rule machines, a hierarchy of portions of the rule machines relevant to different accounts, or a combination thereof.

In this example, rule structure A has one or more rules associated with rule structures A, B, C as corresponding targets. Three separate rules may each have a corresponding target. A first rule may have account B as a target (e.g., or its corresponding rule structure, rule structure B). A second rule may have account C as a target (e.g., or its corresponding rule structure, rule structure C). A third rule may have account D as a target (e.g., or its corresponding rule structure, rule structure D). In another implementation, a single rule in rule structure A may be associated with accounts A, B, and C as targets (e.g., or the corresponding rule structures). As further shown in FIG. 6B, each of the plurality of rule structures may have rules associating the rule structure with one or more additional accounts and/or rule structures. Targets H-I may be targets from rule structures E-I that do not require further processing using a rule structure associated with an additional account.

The plurality of rule structures may be processed in a plurality of computing rounds. Rule structure A may be processed in the first computation round. After rule structure A is processed, a determination may be made that additional rule structures B, C, and D may need to be processed. For example, depending on the event being processed, any of rule structures B, C, and D may be detected as a target of a rule matching the event. Depending on which rules match a processed event, the event may need to be processed for a second computing round (e.g., for rule structures B, C, D), a third computation round (e.g., for rule structures E-I), and so on, until the final targets are reached.

Figure 6C:
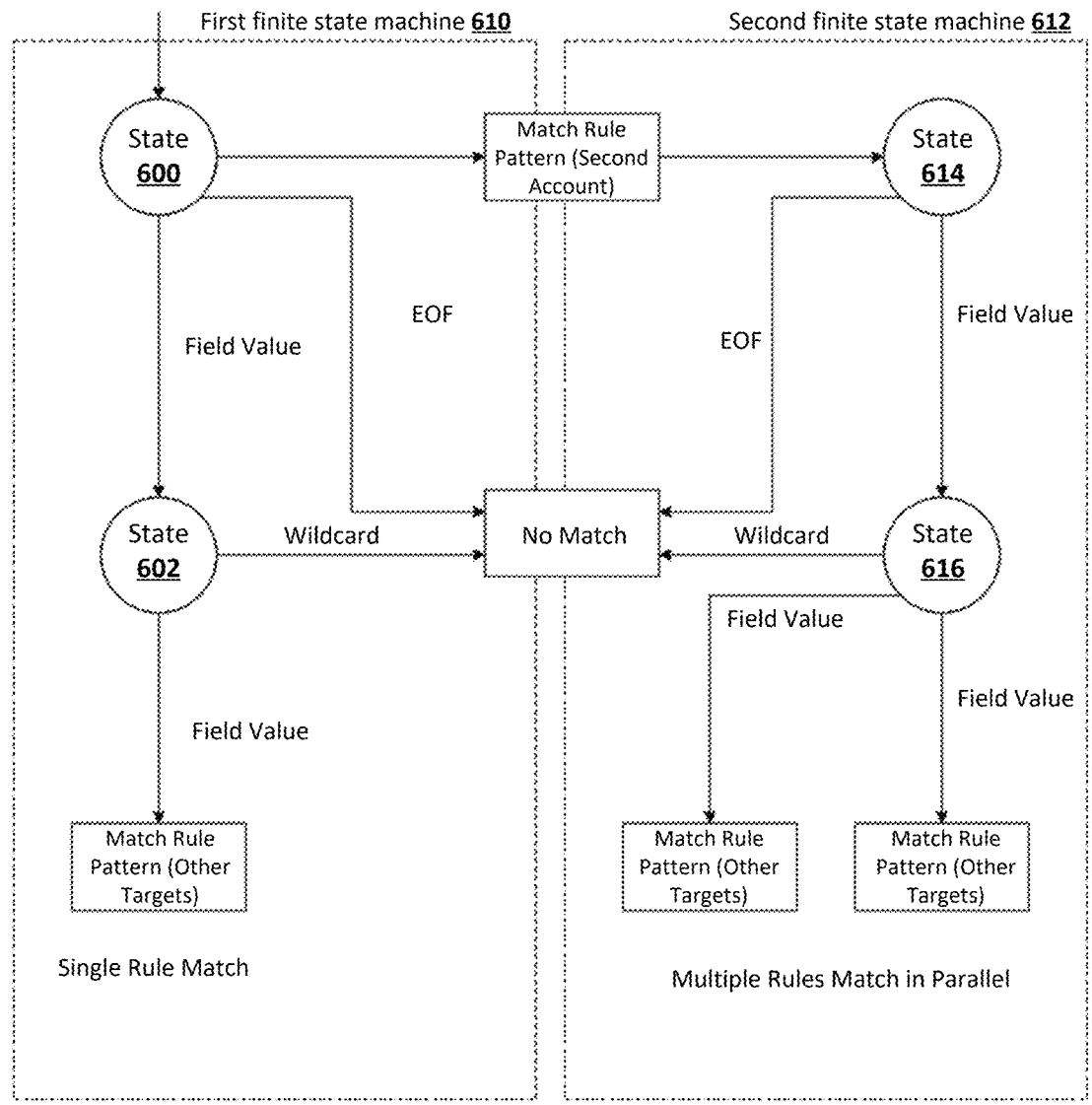
FIG. 6C is a diagram showing an example rule structure.

FIG. 6C is a diagram showing an example rule structure. The example rule structure comprises a first finite state machine 610 and a second finite state machine 612. The first finite state machine 610) may be based on rule patterns for a first account, and the second finite state machine 612 may be based on rule patterns for a second account. The first state machine 610 may comprise state 600) and state 602. The second state machine 612 may comprise state 614 and state 616. Evaluation of the first finite state machine 610 at state 600 results in proceeding to the state 602, determining that an event does not match any rules (e.g., or rule patterns), or, if the event matches a rule associated with the second account, proceeding to state 614 of the second finite state machine 612. The second finite state machine 612 may be used to evaluate the event to further determine any matching rules (e.g., or rule patterns). If the event does not match any rules that have the second account as a target, then the event may be evaluated using only the first finite state machine 610. The first state machine 610 and the second state machine 612 may be generated and/or stored together on the same computing node or may be stored on separate computing nodes.

Figure 6D:
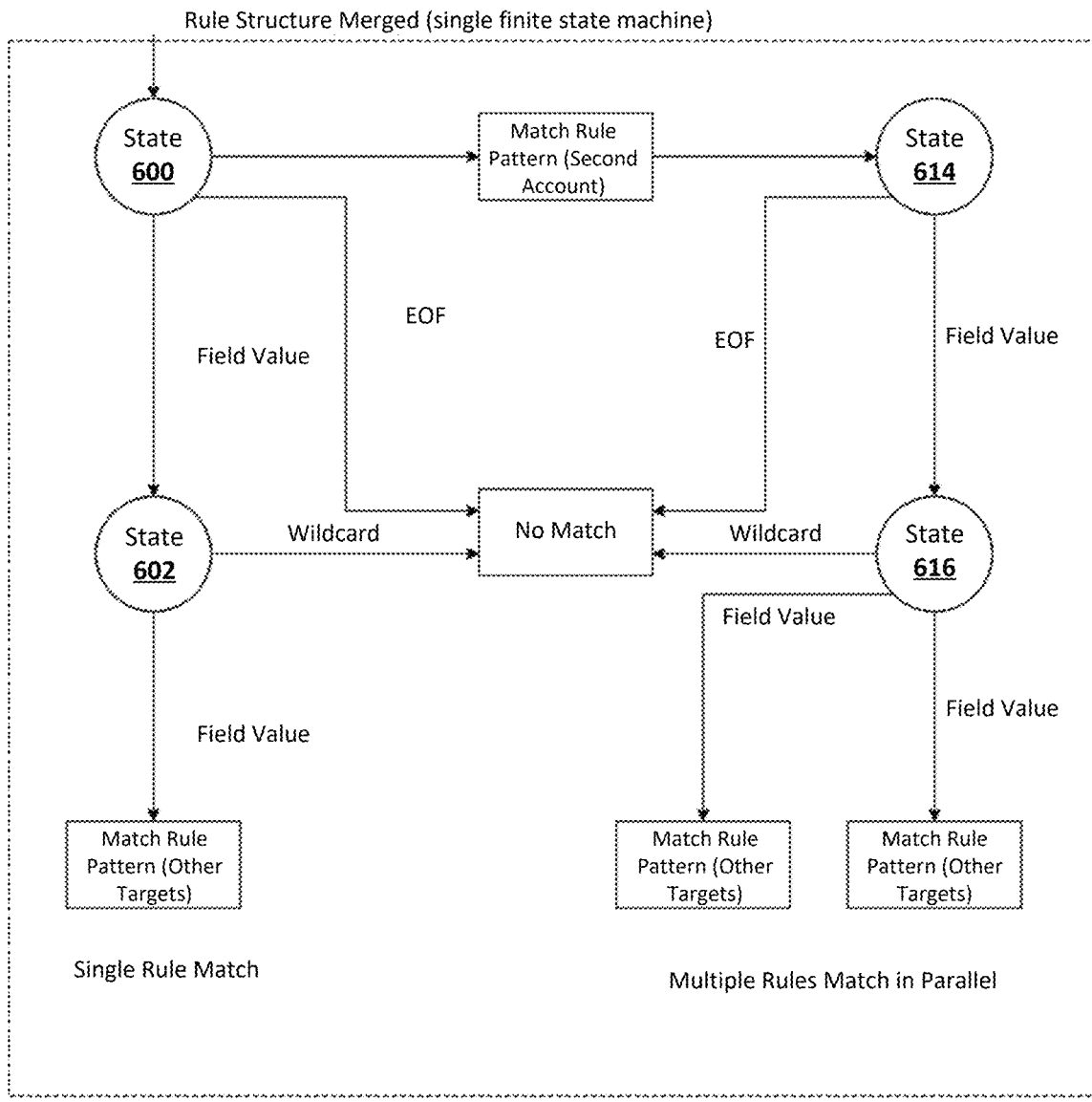
FIG. 6D is a diagram showing another example rule structure.

FIG. 6D is a diagram showing another example rule structure. The example rule structure may be generated based on rules associated with two different accounts. Rules from the two different accounts may merged into a single state machine. The state machine may have states 600, 602 associated with the first account (e.g., shown on the left side) and states 614, 614 associated with the second account (e.g., shown on the right side). If an event matches a rule (e.g., or rule pattern) associated with the second account, evaluation may proceed to the portion of the state machine associated with the second account. For example, the state 614 may be evaluated to determine any further states (e.g., state 616), a failure to find a matching rule, and/or any targets associated with matching a rule.

Figure 6E:
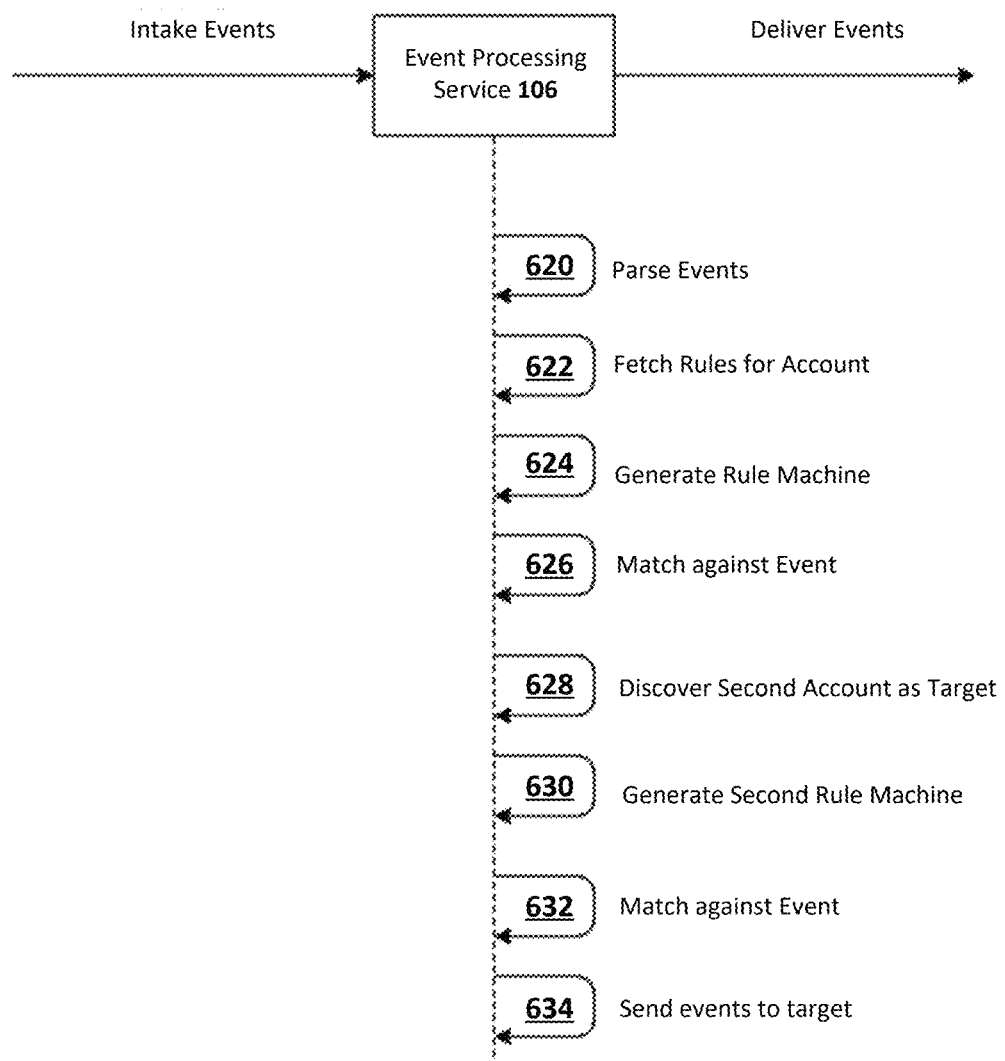
FIG. 6E is a diagram showing processing events using rule structures.

FIG. 6E is a diagram showing processing events using rule structures. The event processing service 106 may receive events. At 620, an event may be parsed. Parsing may include determining fields, field values, an account, event characteristics, and/or the like. At 622, rules associated with the account may be fetched. The rules may be fetched from a remote storage location, such as storage service 108. At 624, a rule machine (e.g., or rule structure) may be generated based on the rules. The rule machine may be generated by a computing node.

At 626, an event may be matched against the rule machine. The event may be input to the rule machine to evaluate one or more states of the rule machine. At 628, a determination may be made that a second account is a target of a rule that matches the event. At step 630, a second rule machine (e.g., or rule structure) may be generated. Rules associated with the second account may be accessed. The second rule machine may be generated based on the rules associated with the second account. At 632, the second rule machine may be evaluated to match an event to a rule. Any matching rules may have one or more associated targets. At 634, the event may be sent to the one or more associated targets.

Figure 7:
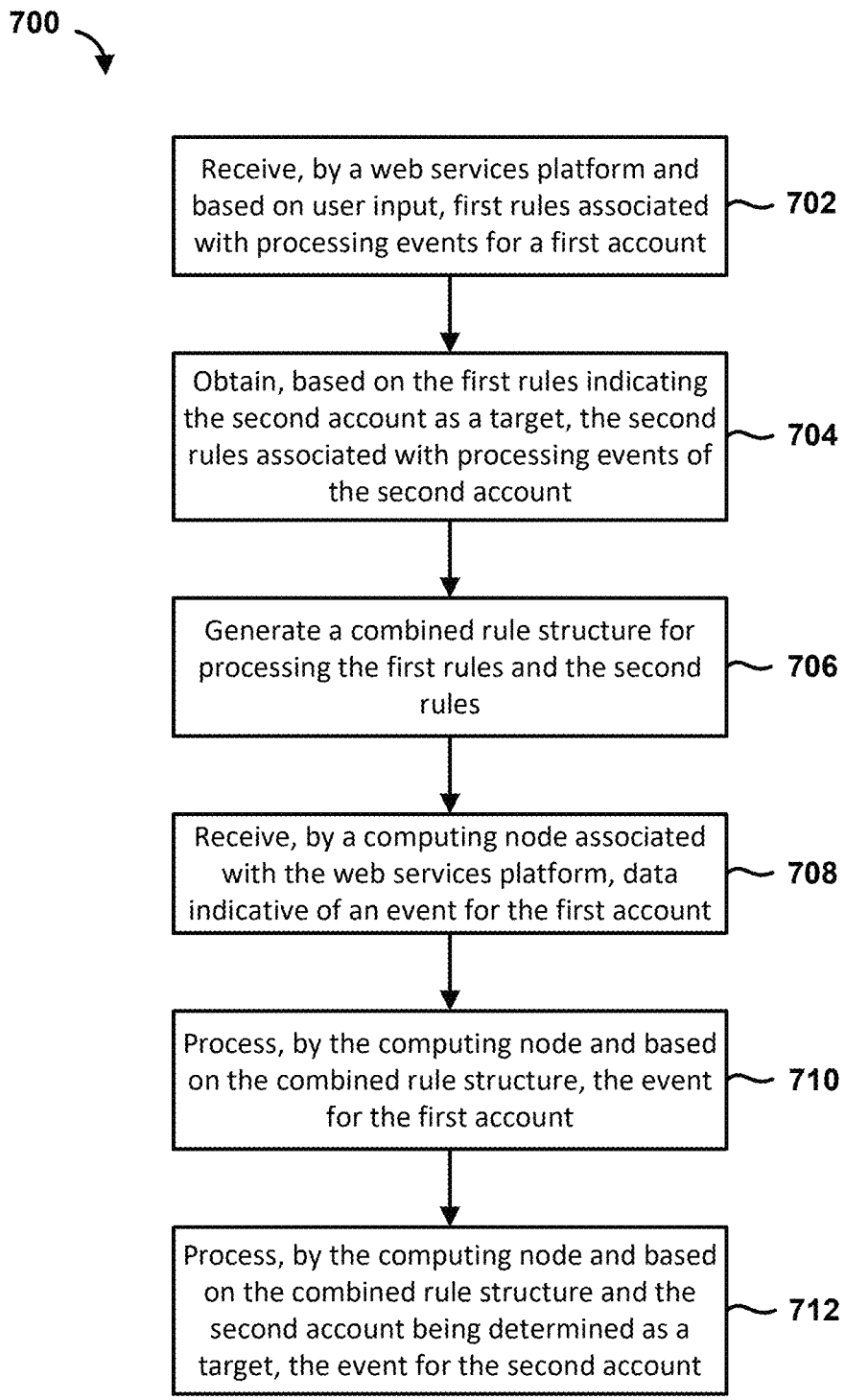
FIG. 7 is a flowchart showing an example process related to an event service.

FIG. 7 is a flowchart showing an example process 700 for use in connection with the disclosed methods. The process 700 may comprise a computer implemented process for processing events (e.g., for an event bus, event processing account). A system and/or computing environment, such as the systems of FIGS. 1 and 2-6, the computing environment of FIG. 9, and/or the computing system of FIG. 10 may be configured to perform the process 700.

Operation 702 depicts receiving first rules associated with processing events for a first account. The first rules may be received by a web services platform. The first rules may be received based on user input. A user may access a user interface of the web services platform. The user may login to the user interface using credentials associated with the first account. At least one rule of the first rules indicates a second account as a target for sending events. The web services platform may be configured to isolate the first account from the second account. The first account may not have direct access to rules, data, and/or the like of the second account (e.g., even though a combined rule structure for both the first rules and second rules may be processed during a single rule processing process). The second account may not have direct access to rules, data, and/or the like of the first account. The first account and the second account may be accounts for an event processing service of the web services platform. The first account may be managed by a first data center (e.g., may store the event data for the first account). The second account may be managed by a second data center different from the first data center. The first data center may be located in a different geographic region than the second data center.

Operation 702 depicts obtaining, based on the first rules indicating the second account as a target, the second rules associated with processing events of the second account. A computing node processing the first rules may access data associated with the second account to access the second rules. The data associated with the second account may be accessed based on the first account having permission from the second account to access the data and/or the second rules.

Operation 706 depicts generating a combined rule structure for processing the first rules and second rules associated with processing events of the second account. The combined rule structure may comprise a rule machine, rule engine, and/or the like. The combined rule structure may comprise a finite-state machine based on the first rules and the second rules. The combined rule structure may comprise a combination of a first finite-state machine based on the first rules and a second finite-state machine based on the second rules. Generating the rule combined structure may comprise generating, based on rule patterns of the first rules and the second rules, one or more of hash table or a tree structure.

Operation 708 depicts receiving data indicative of an event for the first account. The data indicative of the event for the first account may be received by a computing node (e.g., or computing device hosting the computing node) associated with the web services platform. The event may be received from one or more services of a services platform, such as a monitoring service, a content service, a streaming service, a gaming service, a web hosting service, a storage service, a computing service, and/or the like.

Operation 710 depicts processing the event for the first account. The event may be processed by the computing node. The event may be processed based on the combined rule structure. The processing may determine that the second account is a target for the event. Processing the event for the first account may comprise processing a portion of the combined rule structure that is based on rules associated with the first account.

Operation 712 depicts processing the event for the second account. The event may be processed by the computing node. The event may be processed based on the combined rule structure. The event may be processed based on the second account being determined as a target. Processing the event for the second account may comprise processing a portion of the combined rule structure that is based on rules associated with the second account. The combined rule structure may comprise a first rule machine associated with the first rules and a second rule machine associated with the second rules.

In some implementations, the event may be processed for a third account (e.g., or multiple accounts, such as a third and fourth account). The event may be processed for the third account by the computing node. An additional rule of the first rules or the second rules may indicate a third account as an additional target for sending events. Generating the combined rule structure may be further based on third rules associated with processing events of the third account. The event may be processed for the third account based on the combined rule structure (e.g., or a secondary rule structure of the second account). The event may be processed for the third account based on a third account being determined as a target.

Figure 8:
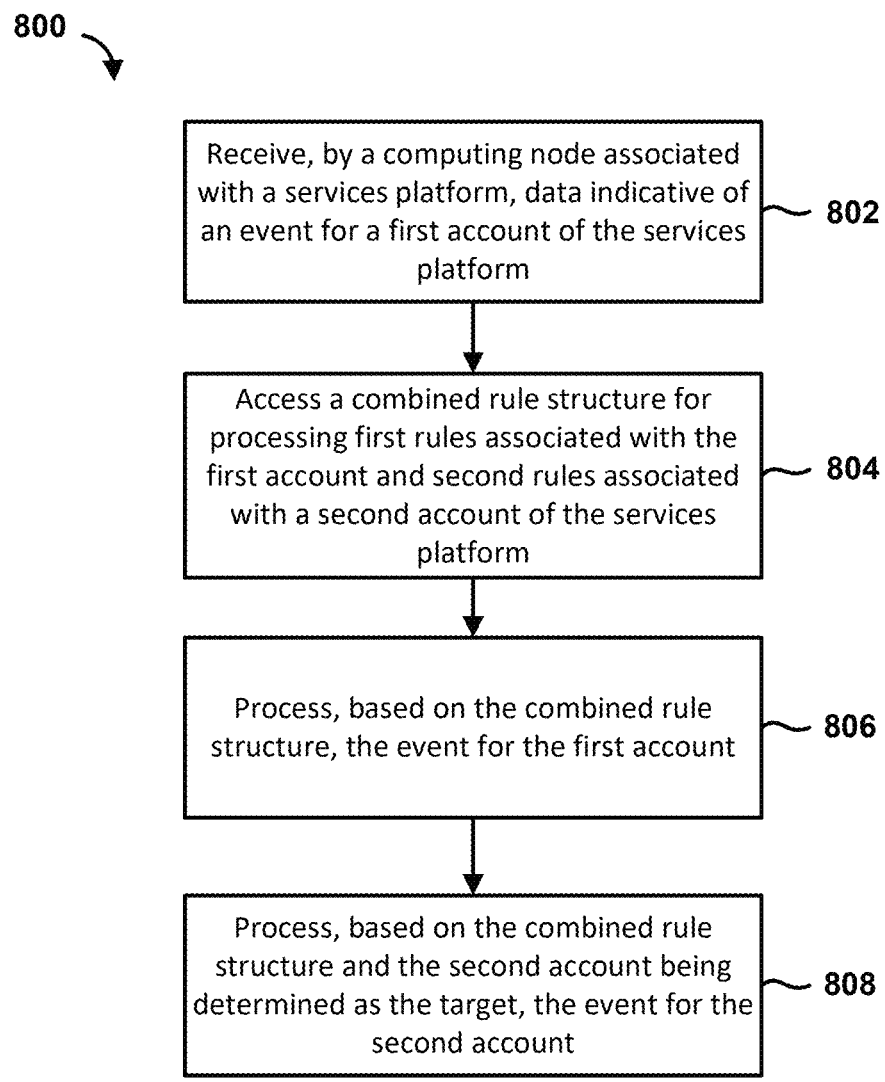
FIG. 8 is a flowchart showing an example process related to an event service.

FIG. 8 is a flowchart showing an example process 800 for use in connection with the disclosed methods. The process 800 may comprise a computer implemented process for processing events (e.g., for an event bus, event processing account). A system and/or computing environment, such as the systems of FIGS. 1 and 2-6, the computing environment of FIG. 9, and/or the computing system of FIG. 10 may be configured to perform the process 800.

Operation 802 depicts receiving data indicative of an event for a first account of a services platform. The data indicative of the event may be received by a computing node associated with the services platform. The services platform may be configured to isolate the first account from the second account. The first account and the second account may be accounts for an event processing service of the services platform.

Operation 804 depicts accessing a combined rule structure (e.g., or rule structure linked to another rule structure) for processing first rules associated with the first account and second rules associated with a second account of the services platform. At least one rule of the first rules may indicate the second account as the target for sending events. The combined rule structure may be based on rule patterns of the first rules and the second rules. The combined rule structure may comprise one or more of a hash table or a tree structure. The combined rule structure may comprise a finite-state machine based on the first rules and the second rules. The combined rule structure may comprise a combination of a first finite-state machine based on the first rules and a second finite-state machine based on the second rules.

A first determination may be made that the first account has granted permission to send events to the second account. A second determination may be made that the second account has granted permission to receive events from the first account. The combined rule structure may be generated based on the first determination and/or the second determination.

In embodiments, a first portion of the combined rule structure for processing the first rules may be generated. It may be determined (e.g., while generating the first portion of the combined rule structure) that the second account is indicated as a target for at least one rule of the first rules. The second rules may be accessed based on the determining that the second account is indicated as the target the second rules. A second portion of the combined rule structure may be generated for processing the second rules. The second portion of the combined rule structure may be based on accessing the second rules (e.g., and determining that the second account is indicated as a target).

Operation 806 depicts processing the event for the first account. The event may be processed for the first account based on the combined rule structure. The processing may determine that second account is a target for sending the event. Processing the event for the first account may comprise modifying the event. Modifying the event may comprise modifying, adding, removing one or more fields of the event. Modifying the event may comprise changing the event from one format to another format.

Operation 808 depicts processing the event for the second account. The event may be processed for the second account based on the combined rule structure. The event may be processed for the second account based on the second account being determined as the target. Processing the event for the second account may comprise processing the modified event. The first account may be managed by a first data center (e.g., may store the event data for the first account). The second account may be managed by a second data center different from the first data center. The first data center may be located in a different geographic region than the second data center.

In some implementations, the event may be processed for a third account (e.g., or multiple accounts, such as a third and fourth account). The event may be processed for the third account by the computing node. The event may be processed based on the combined rule structure (e.g., or a secondary rule structure of the second account). The event may be processed for the third account based on the third account being determined as a target. For example, one or more of the first account or the second account may identify (e.g., via a rule) the third account as a target.

Figure 9:
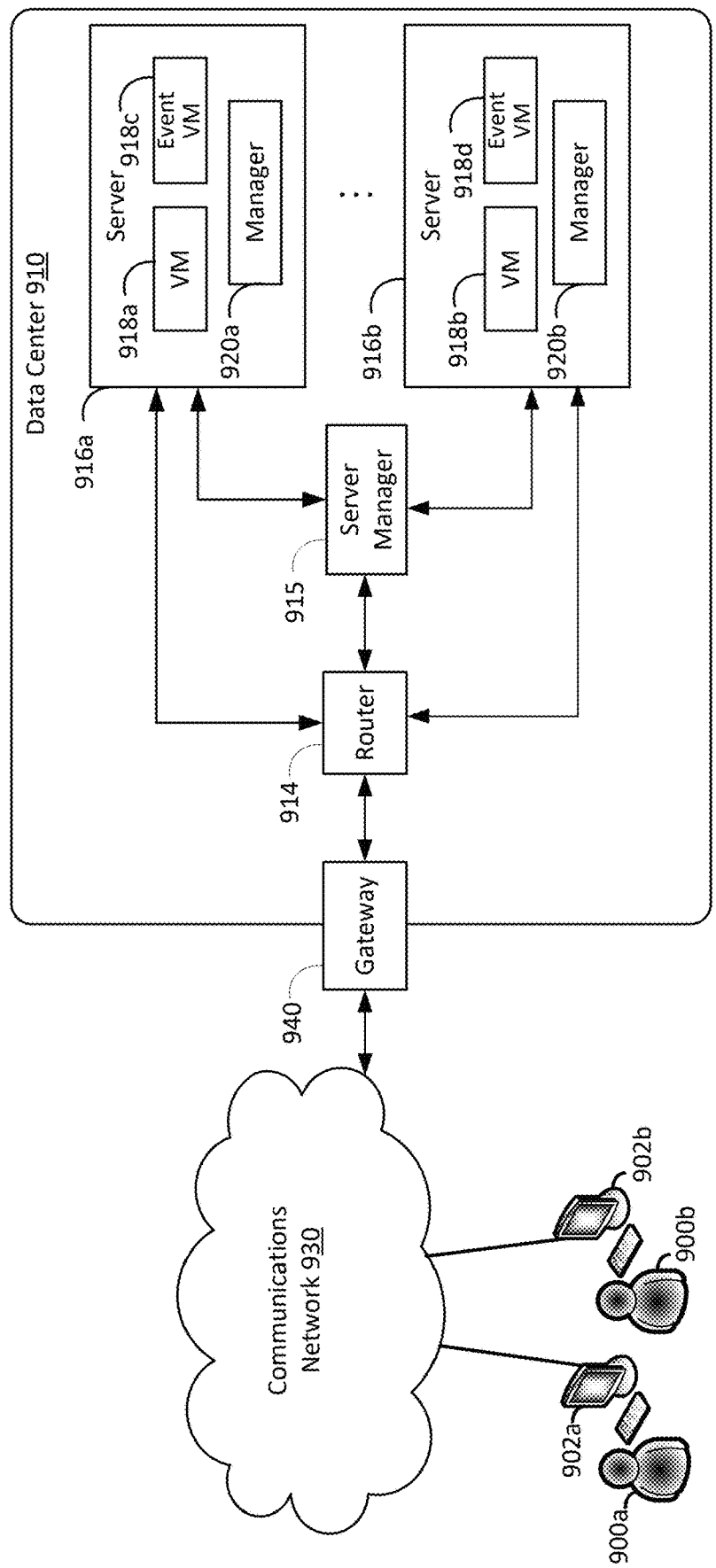
FIG. 9 is a diagram illustrating an example computing system that may be used in some embodiments.

FIG. 9 illustrates an example computing environment in which the embodiments described herein may be implemented. The example computing environment of FIG. 9 may be configured to implement one or more of the services platform, the computing service 102, the monitoring service 104, the event processing service 106, the storage service 108, or a combination thereof of FIG. 1. The example computing environment of FIG. 9 may be configured to implement the intake service 202, the first processing queue 204, the event analyzer 206, the second processing queue 208, the delivery service 210, the target 212, or a combination thereof of FIG. 2. The example computing environment of FIG. 9 may be configured to implement the data store 302, the services platform resources 460, the action execution environment 440), the rule pattern compiler 400, the event reader 420, the rule evaluator 430, the finite-state machine 415, or a combination thereof of FIGS. 3-5, and 6A-E. The example computing environment of FIG. 9 may be configured to implement any of the methods described herein, such as any methods (e.g., or any operations) associated with FIGS. 1-8.

FIG. 9 is a diagram schematically illustrating an example of a data center 910 that can provide computing resources to users 900a and 900b (which may be referred herein singularly as user 900 or in the plural as users 900) via user computers 902a and 902b (which may be referred to herein singularly as computer 902 or in the plural as computers 902) via a communications network 930. Data center 910 may be configured to provide computing resources for executing applications on a permanent or an as-needed basis. The computing resources provided by data center 910 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 910 may include servers 916a-b (which may be referred herein singularly as server 916 or in the plural as servers 916) that provide computing resources. These resources may be available as bare metal resources, or as virtual machine instances 918a-d and (which may be referred herein singularly as virtual machine instance 918 or in the plural as virtual machine instances 918). Virtual machine instances 918c and 918d can be event service virtual machine. The event service virtual machine instances 918c and 918d may be configured to perform all or any portion of the event processing services (e.g., rule structure generation, rule evaluation, event processing based on rule structures, defining rules, defining rule patterns, sending messages to target, etc.) in accordance with the present disclosure and described in detail herein. As should be appreciated, while the particular example illustrated in FIG. 9 includes one event service virtual machine in each server, this is merely an example. A server may include more than one event service virtual machine or may not include any event service virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 9, communications network 930 may, for example, be a publicly accessible network of linked networks and possibly operated by various distinct parties, such as the Internet. In other embodiments, communications network 930 may be a private network, such as, a corporate or university network that is wholly or partially inaccessible to non-privileged users. In still other embodiments, communications network 930 may include one or more private networks with access to and/or from the Internet.

Communication network 930 may provide access to computers 902. User computers 902 may be computers utilized by users 900 or other customers of data center 910. For instance, user computer 902a or 902b may be a server, a desktop or laptop personal computer, a tablet computer, a wireless telephone, a personal digital assistant (PDA), an e-book reader, a game console, a set-top box or any other computing device capable of accessing data center 910. User computer 902a or 902b may connect directly to the Internet (e.g., via a cable modem or a Digital Subscriber Line (DSL)). Although only two user computers 902a and 902b are depicted, it should be appreciated that there may be multiple user computers.

User computers 902 may also be utilized to configure aspects of the computing resources provided by data center 910. In this regard, data center 910 might provide a gateway or web interface through which aspects of its operation may be configured through the use of a web browser application program executing on user computer 902. Alternately, a stand-alone application program executing on user computer 902 might access an application programming interface (API) exposed by data center 910 for performing the configuration operations. Other mechanisms for configuring the operation of various web services available at data center 910 might also be utilized.

Servers 916 shown in FIG. 9 may be standard servers configured appropriately for providing the computing resources described above and may provide computing resources for executing one or more web services and/or applications. In embodiments, the computing resources may be virtual machine instances 918. In the example of virtual machine instances, each of the servers 916 may be configured to execute an instance manager 920a or 920b (which may be referred herein singularly as instance manager 920 or in the plural as instance managers 920) capable of executing the virtual machine instances 918. The instance managers 920 may be a virtual machine monitor (VMM) or another type of program configured to enable the execution of virtual machine instances 918 on server 916, for example. As discussed above, each of the virtual machine instances 918 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 910 shown in FIG. 9, a router 914 may be utilized to interconnect the servers 916*a* and 916*b*. Router 914 may also be connected to gateway 940, which is connected to communications network 930. Router 914 may be connected to one or more load balancers, and alone or in combination may manage communications within networks in data center 910, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 910 shown in FIG. 9, a server manager 915 is also employed to at least in part direct various communications to, from and/or between servers 916*a* and 916*b*. While FIG. 9 depicts router 914 positioned between gateway 940 and server manager 915, this is merely an exemplary configuration. In some cases, for example, server manager 915 may be positioned between gateway 940 and router 914. Server manager 915 may, in some cases, examine portions of incoming communications from user computers 902 to determine one or more appropriate servers 916 to receive and/or process the incoming communications. Server manager 915 may determine appropriate servers to receive and/or process the incoming communications based on factors such as an identity, location or other attributes associated with user computers 902, a nature of a task with which the communications are associated, a priority of a task with which the communications are associated, a duration of a task with which the communications are associated, a size and/or estimated resource usage of a task with which the communications are associated and many other factors. Server manager 915 may, for example, collect or otherwise have access to state information and other information associated with various tasks in order to, for example, assist in managing communications and other operations associated with such tasks.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 910 described in FIG. 9 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices. PDAs, tablets, cellphones, wireless phones, pagers, electronic organizers. Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 10:
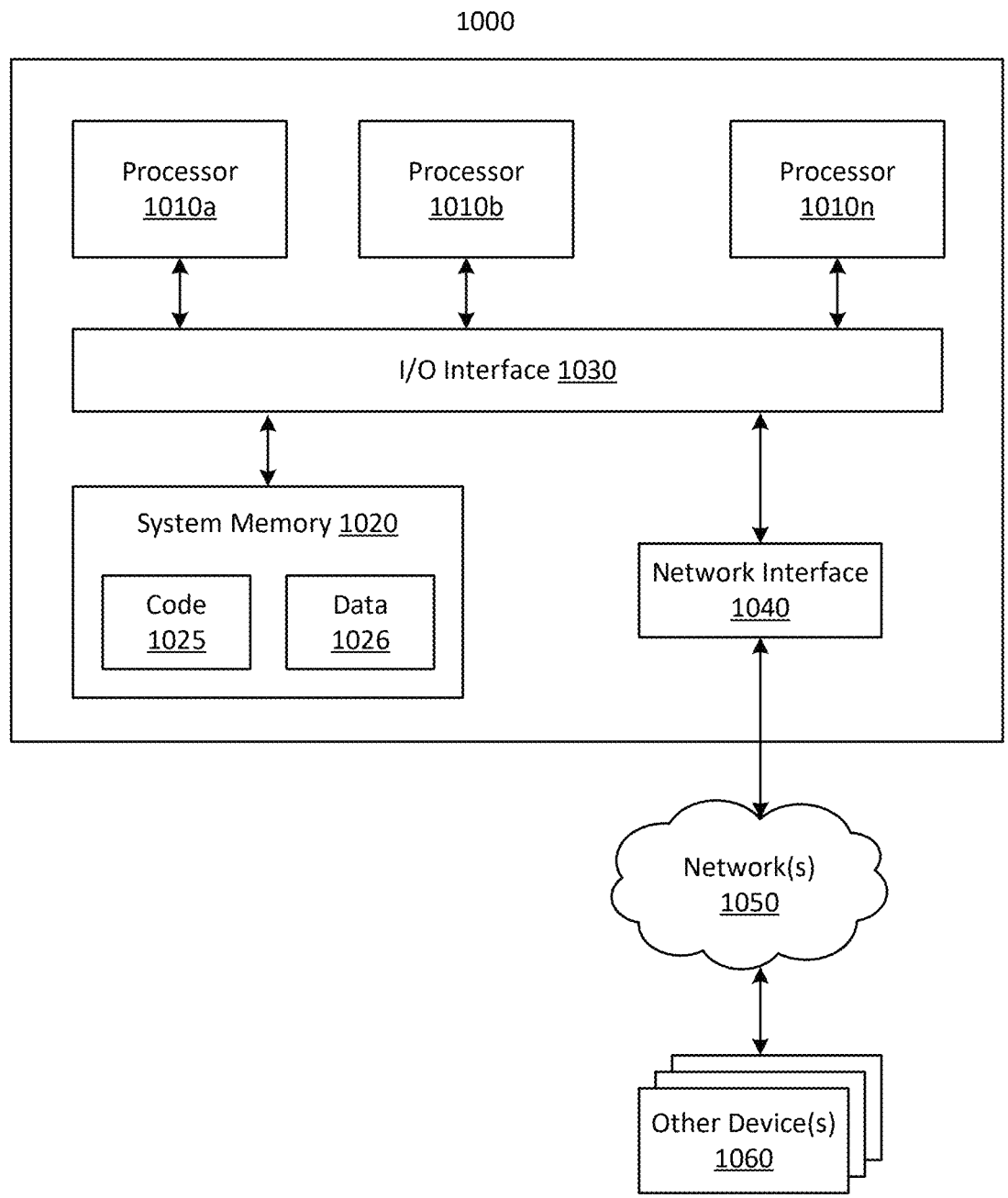
FIG. 10 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. The example computer system of FIG. 10 may be configured to implement one or more of the services platform, the computing service 102, the monitoring service 104, the event processing service 106, the storage service 108, or a combination thereof of FIG. 1. The example computer system of FIG. 10 may be configured to implement the intake service 202, the first processing queue 204, the event analyzer 206, the second processing queue 208, the delivery service 210, the target 212, or a combination thereof of FIG. 2. The example computer system of FIG. 10 may be configured to implement the data store 302, the services platform resources 460, the action execution environment 440, the rule pattern compiler 400, the event reader 420, the rule evaluator 430, the finite-state machine 415, or a combination thereof of FIGS. 3-5 and 6A-E. The example computer system of FIG. 10 may be configured to implement any of the methods described herein, such as any methods (e.g., or any operations) associated with FIGS. 1-8.

In the illustrated embodiment, computing device 1000 includes one or more processors 1010*a*. 1010*b* and/or 1010*n* (which may be referred herein singularly as "a processor 1010" or in the plural as "the processors 1010") coupled to a system memory 1020 via an input/output (I/O) interface 1030. Computing device 1010 further includes a network interface 1040 coupled to I/O interface 1030.

In various embodiments, computing device 1000 may be a uniprocessor system including one processor 1010 or a multiprocessor system including several processors 1010 (e.g., two, four, eight or another suitable number). Processors 1010 may be any suitable processors capable of executing instructions. For example, in various embodiments, processors 1010 may be general-purpose or embedded processors implementing any of a variety of instruction set architectures (ISAs), such as the x86. PowerPC. SPARC or MIPS ISAs or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 1020 as code 1025 and data 1026.

In embodiments. I/O interface 1030 may be configured to coordinate I/O traffic between processor 1010, system memory 1020 and any peripherals in the device, including network interface 1040 or other peripheral interfaces. In some embodiments. I/O interface 1030 may perform any necessary protocol, timing or other data transformations to convert data signals from one component (e.g., system memory 1020) into a format suitable for use by another component (e.g., processor 1010). In some embodiments. I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media. e.g., disk or DVD/CD coupled to computing device 1000 via I/O interface 1030. A non-transitory computer-accessible storage medium may also include any volatile or non-volatile media such as RAM (e.g. SDRAM, DDR SDRAM, RDRAM. SRAM, etc.). ROM (read only memory) etc., that may be included in some embodiments of computing device 1000 as system memory 1020 or another type of memory. Further, a computer-accessible medium may include transmission media or signals such as electrical, electromagnetic or digital signals conveyed via a communication medium such as a network and/or a wireless link, such as those that may be implemented via network interface 1040. Portions or all of multiple computing devices such as those illustrated in FIG. 10 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device." as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances. Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method, the method comprising:
   receiving, by a web services platform and based on user input, first rules associated with processing events for a first account, wherein at least one rule of the first rules indicates a second account as a target for sending events, and wherein the first account and second account are separately managed accounts wherein neither account has direct access to the other account's data or rules and wherein each of the first account and second account correspond to a distinct customer entity of the web services platform;
   obtaining, based on the first rules indicating the second account as a target, second rules associated with processing events of the second account;
   generating a combined rule structure for processing events for the first account based on the first rules and the second rules, wherein the combined rule structure comprises one or more of a finite-state machine based on the first rules and the second rules or a combination of a first finite-state machine based on the first rules and a second finite-state machine based on the second rules, and wherein generating the combined rule structure comprises generating, based on rule patterns of the first rules and the second rules;
   receiving, by a computing node associated with the web services platform, data indicative of an event for the first account; wherein receiving the event comprises fetching rules from the combined rule structure, the rules associated with the one of the accounts based on the data indicative of the event;
   processing, by the computing node and based on the combined rule structure, the event for the first account, wherein the processing determines that the second account is a target for the event; and
   processing, by the computing node and based on the combined rule structure and the second account being determined as a target, the event for the second account.

2. The method of claim 1, wherein the combined rule structure comprises one or more of a finite-state machine based on the first rules and the second rules or a combination of a first finite-state machine based on the first rules and a second finite-state machine based on the second rules.

3. The method of claim 1, wherein generating the combined rule structure comprises generating, based on rule patterns of the first rules and the second rules, one or more of a hash table or a tree structure.

4. The method of claim 1, wherein an additional rule of the first rules or the second rules indicates a third account as an additional target for sending events, and wherein generating the combined rule structure is further based on third rules associated with processing events of the third account, the method further comprising:
   processing, by the computing node and based on the combined rule structure, the event for the third account.

5. The method of claim 1, wherein the first account and the second account are accounts for an event processing service of the web services platform.

6. A system comprising one or more memories having instructions thereon that, upon execution by one or more processors of the system, at least cause the system to:
   receive, by a computing node associated with a services platform, data indicative of an event for a first account of the services platform;
   access a combined rule structure for processing first rules associated with the first account and second rules associated with a second account of the services platform, wherein the first account and second account are separately managed accounts wherein neither account has direct access to the other account's data or rules and wherein each of the first account and second account correspond to a distinct customer entity of the web services platform, and
   wherein the combined rule structure comprises one or more of a finite-state machine based on the first rules and the second rules or a combination of a first finite-state machine based on the first rules and a second finite-state machine based on the second rules, and wherein the combined rule structure is based on rule patterns of the first rules and the second rules;
   process, based on the combined rule structure, the event for the first account, wherein processing the event comprises fetching rules from the combined rule structure, and wherein the processing determines that the second account is a target for sending the event; and
   process, based on the combined rule structure and the second account being determined as the target, the event for the second account.

7. The system of claim 6, wherein the combined rule structure comprises one or more of a finite-state machine based on the first rules and the second rules or a combination of a first finite-state machine based on the first rules and a second finite-state machine based on the second rules.

8. The system of claim 6, wherein the combined rule structure is based on rule patterns of the first rules and the second rules, and wherein the combined rule structure comprises one or more of a hash table or a tree structure.

9. The system of claim 6, wherein the services platform is configured to isolate the first account from the second account.

10. The system of claim 6, wherein the first account is managed by a first data center and the second account is managed by a second data center different from the first data center.

11. The system of claim 6, wherein the instructions, upon execution by one or more processors of the system, further cause the system to determine that the first account has granted permission to send events to the second account, and wherein the system is caused to generate the combined rule structure based on the determining that the first account has granted permission to send events to the second account.

12. The system of claim 6, wherein the system is caused to process the event for the first account by modifying the event and caused to process the event for the second account by processing the modified event.

13. The system of claim 6, wherein at least one rule of the first rules indicates the second account as the target for sending events.

14. The system of claim 6, wherein the instructions, upon execution by one or more processors of the system, further cause the system to:
generate a first portion of the combined rule structure for processing the first rules;
determine, while generating the first portion of the combined rule structure, that the second account is indicated as a target for at least one rule of the first rules;
access, based on the determining that the second account is indicated as the target, the second rules; and
generate, based on accessing the second rules, a second portion of the combined rule structure for processing the second rules.

15. A non-transitory computer-readable storage medium having stored thereon computer-readable instructions, the computer-readable instructions comprising instructions that, upon execution on one or more computing devices, at least cause:
receiving, by a computing node associated with a services platform, data indicative of an event for a first account of the services platform;
accessing a combined rule structure for processing first rules associated with the first account and second rules associated with a second account of the services platform, wherein the first account and second account are separately managed accounts wherein neither account has direct access to the other account's data or rules and wherein each of the first account and second account correspond to a distinct customer entity of the web services platform, and
wherein the combined rule structure comprises one or more of a finite-state machine based on the first rules and the second rules or a combination of a first finite-state machine based on the first rules and a second finite-state machine based on the second rules, and wherein the combined rule structure is based on rule patterns of the first rules and the second rules;
processing, based on the combined rule structure, the event for the first account, wherein processing the event comprises fetching rules from the combined rule structure, and wherein the processing determines that second account is a target for the event; and
processing, based on the combined rule structure and the second account being determined as a target, the event for the second account.

16. The computer-readable storage medium of claim 15, wherein the combined rule structure comprises one or more of a finite-state machine based on the first rules and the second rules or a combination of a first finite-state machine based on the first rules and a second finite-state machine based on the second rules.

17. The computer-readable storage medium of claim 15, wherein the combined rule structure is based on rule patterns of the first rules and the second rules, and wherein the combined rule structure comprises one or more of a hash table or a tree structure.

18. The computer-readable storage medium of claim 15, wherein the services platform is configured to isolate the first account from the second account.

19. The computer-readable storage medium of claim 15, wherein the first account and the second account are accounts for an event processing service of the services platform.

20. The computer-readable storage medium of claim 15, wherein the instructions, upon execution on one or more computing devices, further cause determining that the first account has granted permission to send events to the second account, and wherein generating the combined rule structure is based on the determining that the first account has granted permission to send events to the second account.

\* \* \* \* \*